(12) United States Patent
Baldwin et al.

(10) Patent No.: US 12,470,381 B2
(45) Date of Patent: Nov. 11, 2025

(54) CONTROLLING EXECUTION OF MACHINE LEARNING MODELS

(71) Applicant: Hewlett-Packard Development Company, L.P., Spring, TX (US)

(72) Inventors: Adrian John Baldwin, Bristol (GB); Christopher Ian Dalton, Bristol (GB); Pierre Belgarric, Bristol (GB); David Plaquin, Bristol (GB); Daniel Cameron Ellam, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 291 days.

(21) Appl. No.: 18/249,164

(22) PCT Filed: Oct. 29, 2020

(86) PCT No.: PCT/US2020/058013
§ 371 (c)(1),
(2) Date: Apr. 14, 2023

(87) PCT Pub. No.: WO2022/093240
PCT Pub. Date: May 5, 2022

(65) Prior Publication Data
US 2023/0396435 A1  Dec. 7, 2023

(51) Int. Cl.
*H04L 9/30* (2006.01)
*G06N 20/00* (2019.01)

(52) U.S. Cl.
CPC .............. *H04L 9/30* (2013.01); *G06N 20/00* (2019.01)

(58) Field of Classification Search
CPC ....... H04L 9/30; H04L 9/0897; H04L 9/3247; H04L 9/50; H04L 41/16; G06N 20/00; G06F 11/28; G06F 7/023; H04N 21/251; H04N 21/466; H04N 21/45; H04N 21/4662
See application file for complete search history.

(56) References Cited

U.S. PATENT DOCUMENTS

| | | |
|---|---|---|
| 6,490,719 B1 | 12/2002 | Thomas |
| 9,286,187 B2 | 3/2016 | Brucker et al. |
| 9,323,504 B1 | 4/2016 | Kinast et al. |
| 9,747,079 B2 | 8/2017 | Siu et al. |

(Continued)

OTHER PUBLICATIONS

Chen, et al., DeepAttest: An End-to-End Attestation Framework for Deep Neural Networks, 2019. In the 46th Annual International Symposium on Computer Architecture (ISCA '), June 22, 2019, 12 pages.

(Continued)

*Primary Examiner* — Michael Won
(74) *Attorney, Agent, or Firm* — Quarles & Brady LLP

(57) ABSTRACT

In an example, an apparatus is described. The apparatus comprises processing circuitry comprising a control module. The control module determines whether a computing device communicatively coupled to the control module is in a specified state for executing a machine learning model controlled by a third party entity. In response to determining that the computing device is in the specified state, the control module is to send, to an attestation module in a data processing pipeline associated with the computing device, an indication that the computing device is in the specified state.

21 Claims, 9 Drawing Sheets

(56) References Cited

U.S. PATENT DOCUMENTS

| | | | |
|---|---|---|---|
| 11,159,318 B2* | 10/2021 | Maim | H04L 9/3239 |
| 11,442,770 B2* | 9/2022 | Ismael | G06F 9/545 |
| 11,582,260 B2* | 2/2023 | Cheng | H04L 9/0643 |
| 11,755,451 B2* | 9/2023 | Doni | G06F 11/3409 |
| | | | 706/46 |
| 2008/0082959 A1 | 4/2008 | Fowler | |
| 2018/0034642 A1* | 2/2018 | Kaehler | H04L 63/101 |
| 2019/0020647 A1* | 1/2019 | Sinha | H04L 63/061 |
| 2020/0082270 A1 | 3/2020 | Gu et al. | |
| 2020/0259712 A1* | 8/2020 | Jonnalagadda | H04L 41/0843 |
| 2022/0321647 A1* | 10/2022 | Berggren | H04L 67/10 |
| 2024/0022609 A1* | 1/2024 | Smith | G06F 9/5088 |

OTHER PUBLICATIONS

Hanzlik, et al., "MLCapsule: Guarded Offline Deployment of Machine Learning as a Service", In Proceedings of ACM Conference, New York, NY, USA, 2019, 14 pages.

* cited by examiner

CONTROLLING EXECUTION OF MACHINE LEARNING MODELS

BACKGROUND

A service provider may provide a service user with access to a processing resource in the cloud to allow the service user to process data using a machine learning (ML) model controlled by the service provider. A computing device at the network edge may also be used to execute the service provider's ML model.

BRIEF DESCRIPTION OF DRAWINGS

Non-limiting examples will now be described with reference to the accompanying drawings, in which.

DETAILED DESCRIPTION

System Architecture

Figure 1:
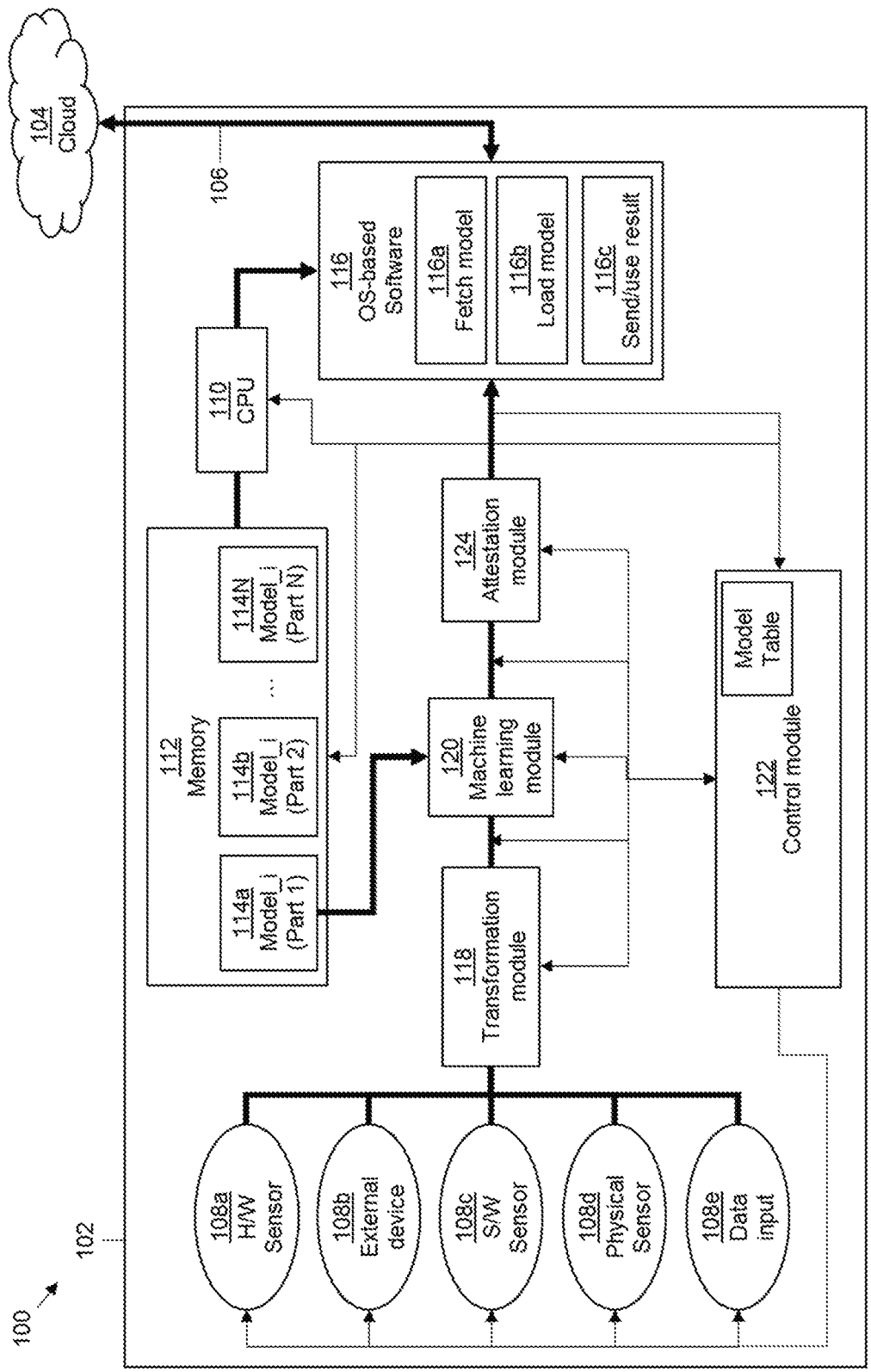
FIG. 1 is a simplified schematic illustration of an example system for facilitating the execution of a machine learning model on a computing device.

A number of applications and business processes use machine learning (ML) models. For example, ML models may be used for certain performing recognition (e.g., of image or sound) and/or for computed-based decision making. From the perspective of a service provider, providing access to a processing resource (e.g., a cloud-based service) for executing an ML model may ensure that the service provider may control the execution of the ML model (e.g., in the cloud). For example, the data input to the ML model may be pre-processed in a way that can be controlled or monitored by the service provider. Further, the ML model itself may be trained and used in a controllable manner while ensuring that the ML model remains secure.

A cloud-based service where a user device accessing the cloud-based computing resource sends data to and/or receives results from the service provider-controlled computing resource may experience lag when communicating data via the network. At certain times the cloud-based service may restrict the availability of the computing resource for processing requests submitted by the user device. Further, a user may have to pay for use of network bandwidth when transmitting data over the network, which could be pricy for transmitting large amounts of data. In some examples, there may be scenarios where a user has a concern about transmitting certain types of data to a cloud-based service such as privacy-sensitive data (e.g., speech and/or other personal data).

An edge computing device that is physically closer to the data source and/or the user device (e.g., the user device could be the edge computing device itself) that submits a request for processing the data may provide a way to reduce the lag, free up processing resource in a network, reduce network usage/cost and/or ensure that certain types of data is not exposed to reduce privacy and/or security concerns. However, the service provider may not be able to trust the configuration of the edge computing device running the ML model. For example, the service provider may have intellectual property (IP) concerns due to the confidential information relating to the ML model (e.g., model type, neural network weights, etc) released to the edge computing device. Further, the service provider may have security concerns due to the potential for the released model being stolen or corrupted. Further still, the results output by the edge computing device may not be trusted if the machine learning model is not executed in a manner expected by the service provider.

Certain features of ML models in terms of how such models may be implemented and used may raise certain issues in terms of how these models are executed on edge computing devices.

In some examples, a training or learning process in an ML model involves improving an ML model by presenting it with example input and an anticipated output for that input. The training or learning process may further involve adapting the model so the actual output becomes closer to the anticipated output. This can be done prior to deploying a model or via incremental training to update a model once deployed. In such examples, the example input and/or the anticipated output (and corresponding adaptation) may not be monitored and/or controlled by the service provider. Further, the deployment and/or any incremental training to update the model once deployed may lead to unexpected or disallowed changes to the ML model which may not necessarily be monitored or controlled by the service provider.

In some examples, an inferencing process may involve using the ML model so that a new input is presented and the output is then used as the decision, which may then be acted upon. The implementation and result of this inferencing process may not necessarily be monitored or controlled by the service provider.

In some examples, the data used in ML models for training and/or inferencing may not be monitored by the service provider. For example, in contrast to the scenario where a service provider-controlled cloud-based service receives data (e.g., from a user device, sensor, etc) which can then be checked and/or correctly processed by the cloud-based service, where the data is collected in the field and not seen or controlled by the service provider, there may be a possibility that the data received by the edge computing device cannot be trusted by the service provider. In other similar words, the service provider may be concerned with the provenance and lineage of the data. For example, the service provider may need to understand what data source generated the data and/or how the data has been transformed prior to being used in an ML model.

In some examples, the validity of a model may depend on the quality of its training data. The trust and quality of output data in an inference stage may depend on the level of trust in the origin and/or processing of the input data.

In some examples, certain provenance and lineage concepts for both training data and inferencing may be defined in order to provide confidence in the edge-implementation of an ML model. In an example, a service provider may wish to ascertain where the data originated from and/or whether its source is genuine. In another example, when data passes through various routines, systems and storage etc., the service provider may wish to have evidence that the correct data processing procedures have (or are going to be) applied within the data processing pipeline. In some examples, data processing may include: signal processing (for example, image filtering or down scaling), feature extraction such as edge detection or gathering statistics, or other ML models such as clustering or auto-encoders to filter out adversarial noise, before the final ML model is applied. In another example, the service provider may wish to have evidence that other processes cannot interfere with the data processing pipeline to manipulate or delay the dataflow. In another example, the service provider may wish to have 'data validation' procedures that complement the ML data pipeline to validate that the data received is correct or within an acceptable range. Such validation may include, for example, judging light levels in an image, or looking for potential adversarial inputs.

In some examples, certain threats to the provenance and lineage of data used in an ML model may be apparent when implementing training and/or inferencing. For example, when training an ML model, an attacker may indirectly change model parameters by feeding malicious, attacker-generated data into the ML model's learning procedure with the objective of making malicious data points classify as legitimate ones. In another example, when performing inferencing, an attacker could add 'adversarial noise' to sensor data and hence skew a classification and resultant action.

In some examples, the success of implementing an ML model may depend on feature extraction and selection. A data transformation process used by the edge computing device may not provide the service provider with the information to determine whether or not the ML model decisions are correct.

In some examples, the intellectual property (IP) of the service provider may become public domain knowledge and/or otherwise exploitable by an attacker to yield incorrect results, for example, to decrease user trust in the ML model.

For example, if a service provider has trained an ML model (and invested considerable time and effort into doing so), the service provider may wish to determine whether or not to deploy the model on an untrusted end-point so that they have reasonable guarantees that the user cannot get the model. An example threat scenario involves the model weights being directly read (e.g., in plaintext) out of the endpoint by the user of the device (who may have operating system (OS) admin rights) or an attacker gaining access through the user account or through subverting the OS kernel. Another example threat scenario involves the model being reconstructed using extraction techniques, e.g., by querying a model (whose weights cannot be read directly) with a carefully constructed set of queries.

In some examples, a party such as a user and/or service provider may need to establish whether to trust output data resulting from executing an ML model. In some examples, if a party is relying on a decision made by an ML model performing inferencing on an end-point, the party may wish to establish whether to trust the resulting output. There may be two elements to establish whether to the trust in the output of an inference workload. For example, the trust in the model itself, and the trust in the proper security of the compute engine (e.g., that its firmware was not compromised).

For example, a party may wish to establish whether the output data comes from an ML model that is trusted. Example threats include malicious changes to model weights or the code used to execute the ML model. There are multiple examples of the machine learning pipeline which may affect the trust in a model. In some examples, certain static properties may affect whether to trust the data output from the model. For example, the party may wish to establish proof that the model used is the one that was intended. For example, this proof may include whether the model update is secure (e.g., if the model is pushed from the cloud) and/or whether the model is trained with legitimate and trusted data. In some examples, certain dynamic properties may affect whether to trust the data output from the model. For example, an attacker may actively change model decision boundaries by altering unprotected model parameters. Such changes may be an issue with incremental learning, for example, the party may wish to establish trust that the model has not evolved too far from an acceptable model.

In some examples, the service provider may wish to establish whether the compute engine used to implement the ML model is robust against software and/or hardware attacks. Secure inferencing may rely on the robustness of the platform's underlying robustness to attacks. If a software vulnerability is exploited, for example by performing a malware attack, an attacker may be able to tamper with the model weights, the ML model itself and/or directly affect the data output reported.

FIG. 1 depicts an example system 100 for implementing certain methods, apparatus and/or machine readable media described herein. The system 100 may provide a way for a third party computing device (e.g., a server or a computing device at the network edge) to be trusted to execute an ML model controlled by an entity such as a service provider and/or to ensure that data in a data processing pipeline of the computing device is trustable and/or reduce the likelihood of an attack on the ML model itself and/or data in the data processing pipeline. The methods, apparatus and/or machine readable media described herein refer to certain elements of the system 100, which are described in more detail below.

The system 100 provides an architecture for performing data gathering, ML training and/or inferencing (e.g., on an end-point computing device, via an untrusted data source and/or using a cloud-based service) based on implementing a control plane to control a data plane. The data plane defines a data processing pipeline for communicating data from a data input (e.g., a sensor), via certain modules of a computing device for receipt by a third party entity not in control of the computing device such as a service provider. As will be explained in more detail below, this architecture may provide trust in the data processing pipeline for the third party entity.

In some examples, the control plane comprises a module (e.g., an attestation module) for attesting to the lineage of the data in the data processing pipeline and/or the ML model implemented by an ML engine of the computing device. Since the control plane may control loading and management of ML models, the control plane may facilitate attestation to the provenance/lineage of data being processed by the ML engine (e.g., inferencing decisions or model changes due to local training).

In some examples, the architecture of the system 100 may be supported by hardware components and/or data flow control for facilitating certain methods, apparatus and/or machine readable media described herein. In some examples, certain methods, apparatus and/or machine readable media described herein may be implemented though process isolation supported by central processing unit (CPU) features and/or cryptographic flow controls. In some examples, strong isolation could be enforced though mechanisms such as software guard extensions (SGX) or Trustzone. In some examples, virtualization could be used to separate a controller (e.g., the 'control module' described herein) for the control plane from the OS (e.g., with processor support to protect the system memory).

In the example of FIG. 1, the system 100 comprises a computing device 102 communicatively coupled to a cloud 104 (e.g., operated by a service provider or, in some examples, operated by an untrusted entity) via a network connection 106 (e.g., wired or wireless). In some examples, the computing device 102 may refer to an end-point device or edge device (e.g., a user device such as a personal computer (PC), laptop, smartphone, tablet etc., internet of things (IoT) device, printer, etc) that may be used to implement (e.g., 'set-up' and/or 'run') an ML model (controlled by a service provider) at or near a network edge. Thus, rather than the cloud 104 implementing the ML model as in some example scenarios, the computing device 102 itself may implement the ML model. However, in some examples, the computing device 102 may refer to a server or cloud-based computing device that is not at or near the network edge. For example, a third party entity in control of an ML model such as a service provider may not trust or have control over the server or cloud-based computing device. Thus, the computing device 102 may refer to any computing device in a network implementing an ML model where a third party entity may not necessarily be able to monitor, control or trust the computing device 102 that implements the ML model. Similarly, the data source may be anywhere in the network (e.g. at or near the network edge, or at or near a network server). Thus, in some scenarios, the third party entity may not be able to monitor or control the data input to the computing device.

In this example, the computing device 102 comprises (or is at least communicatively coupled to) a variety of potential data sources 108 (i.e., a hardware (H/W) sensor 108a, external device 108b, software (S/W) sensor 108c, physical sensor 108d and data input 108e). In some examples, there may be a single data source 108. Some sensor types may provide similar or same functionality to each other (e.g., a hardware sensor may have similar properties to a physical sensor) but they may provide data in a slightly different way, for example, as described in more detail below. In some examples, the computing device 102 comprises any number (e.g., at least one) or any combination of such data sources 108, examples of which are described in more detail below. In some examples (not shown), the computing device 102 does not comprise a data source 108 itself but may be communicatively coupled to the data source 108 (e.g., via a network connection, bus (e.g., universal serial bus, or other data standard connector), etc). Thus, in such examples, the data source 108 may not be comprised in the computing device 102 itself.

In some examples, the hardware sensor 108a gathers information about the state of hardware of the computing device 102. For example, within a CPU 110 there may be at least one hardware counter which can take measurements derived from the computing device 102. Other parts of the main chipset of the computing device 102 may also provide measurements—for example, performance counters. The state of hardware may be probed by running software probes. In some examples, it may be possible for certain physical sensors such as a temperature sensor to provide side-channel information about the state of hardware of the computing device 102.

In some examples, the external device 108b provides data from an electronics system that is not under the supervision of the control plane. Thus, the term 'external' may refer to a device or sensor that is not supervised by the control plane. In this case, there may be a trust boundary between the external device 108b and a computing device used to compute data provided by the external device 108b. This boundary may be defined as a data source 108 within the system 100 described in FIG. 1.

Examples of external devices 108b may include components such as peripheral devices, distributed sensors or internet of things (IoT) devices that can be networked to the computing device 102 such that the control plane may obtain sufficient assurance about the external device 108b and a sufficiently secure data communication channel between the computing device 102 and the external device 108b. Other example external devices 108b may be other components within the same physical enclosure as the computing device 102 itself but outside of the direct control of the main operating system (OS). Examples of such other devices may include a network interface card (NIC) or a memory (e.g., a user-supplied disk coupled to a drive for reading data from the disk or a universal serial bus (USB) memory device inserted into a corresponding USB socket of the computing device) within a personal computer (PC)-type system, laptop, tablet, etc. Example peripheral devices may feature their own micro controller and/or their own integrated sensor, e.g., a physical sensor and/or software sensor. For example, an NIC may provide network flow information.

In some examples, the software sensor 108c probes the state of the computing device 102 and/or evolution of software running on the computing device 102. In some examples, the software sensor 108c comprises executed code. For example, the software sensor 108c may comprise a monitoring agent running in the OS, a kernel-based sensor, Trustlets in hyper-v, sensors in secure processor boundaries such as software guard extensions (SGX), system management mode (SMM), or within a processing management engine. The environment the software sensor runs in may affect its trust as a data source. Certain examples described herein may record information about the trusted state of the computing device and/or attempt to secure data transmission through other untrusted components.

In some examples, the software sensor 108c may monitor data accessed from the cloud 104 where the main OS is responsible for gathering the information and handing the network traffic between the computing device 102 and the cloud 104.

In some examples, the external device 108b and/or software sensor 108c may provide input from a user (e.g., 'user input' or 'device input').

In some examples, the external device 108*b* and/or software sensor 108*c* may comprise a human-machine interface (HMI) of the computing device 102. A human may report information about thoughts, knowledge, sensed environment, etc. This information may be provided via a human-machine interface (HMI). Where human-fed information is provided, the trust attributed to such information may vary between individuals providing such information because of intentional adversarial inputs and/or because of unconscious information processing flaws. In some examples, an HMI may be implemented as a software sensor 108*c* where the OS may mediate the input from the user. In some examples, a host controller interface (HCI) such as a USB may input data to the computing device 102 via a trusted component (e.g., built into the computing device 102).

In some examples, the physical sensor 108*d* comprises a device to directly sense the physical world such as a camera, microphone, accelerometer, temperature sensor, etc (e.g., embedded as part of the computing device 102). Thus, in such examples, the control plane may be in control of the measurements or data obtained by such physical sensors 108*d*. The obtained data may be analogue or digital, as appropriate.

In some examples, the data source 108 may be referred to as a data input 108*e*. Thus, the hardware (H/W) sensor 108*a*, external device 108*b*, software (S/W) sensor 108*c* and physical sensor 108*d* may be regarded as examples for providing data input for the computing device 102.

The computing device 102 further comprises a memory 112 (e.g., accessible to the CPU 110 of the computing device 102). The memory 112 may store an ML model, 'Model_i' 114 (in some examples, comprising multiple parts, 'Part 1' 114*a*, 'Part 2' 114*b* through to 'Part N' 114N). The ML model 114 may be stored for future use or accessed as needed when the ML model 114 is to be executed. In some examples, a certain part or number of parts of the ML model 114*a*-N may be used or accessed when implementing the ML model 114. For example, different ML models 114 may be used for different data sources 108 and/or for different scenarios. The memory 112 may not initially store the ML model 114 although in some examples, a part of the ML model 114 may be stored initially and further parts of the ML model 114 may be stored in the memory 112 if or when the computing device 102 is trusted to store the ML model 114.

In some examples, at least part of the ML model 114 may be stored in a protected or secured way to protect certain memory pages, for example, using a memory controller and/or via a cryptographic control protocol.

In some examples, the computing device 102 further comprises OS-based software 116 (e.g., to implement tasks other than executing the ML model 114). In some examples, the OS 116 may operate outside of a trust boundary but be involved to facilitate operation of the computing device 102, including facilitating communication between the computing device 102 and the cloud 104 and controlling operation of individual modules of the computing device 102 such as the CPU 110, the memory 112 and other modules involved in executing the ML model 114.

The OS 116 comprises certain instructions which, when executed by the CPU 110, control operation of the computing device 102 and its interaction with the cloud 104.

In some examples, the OS 116 comprises 'fetch model' instructions 116*a* to download at least part of the ML model 114 from the cloud 104. Thus, where a reference is made herein to receiving the ML model 114 from the cloud, this may refer to receiving part of or the entire ML model 114.

In some examples, the ML model 114 may be encrypted according a root of trust identity associated with the computing device 102.

In some examples the ML model 114 (or at least part of the ML model 114) downloaded from the cloud 104 may be accompanied by additional information in order to support third party entity (e.g., service provider) control over the implementation of the ML model 114 and/or whether to allow the computing device 102 to receive the ML model 114. In some examples, the ML model 114 and the additional information may form a 'model package' as created by the controller or owner of the ML model 114. In some examples, the additional information may be referred to as a 'contract', 'model contract', 'model specification', 'model execution specification', 'a condition', 'model execution condition', 'third party policy', etc.

In some examples, the additional information comprises a set of descriptions of the data pipeline for the ML model 114 and the associated hash of the model 114 along with any pre-conditions to the use of this model (for example, this may include a specification of hardware and/or software components that are to be in place in the computing device 102). Examples of specifications for such components include: (1) Sensors to be used (e.g., which data source(s) 108 to use). (2) Transformations to be applied to the data from sensors. (3) Feature selection protocols (and any buffering of data) when determining which data to use and when to implement processing of the ML model 114. For example, data provided for an ML model may be collected over a time window, hence buffering into that time window may be used. A further example is where data is input in an ML model using a rolling window over temporal data (for example, where the input is over 10 seconds and the ML model is run every 2 seconds). (4) At least part of the ML model 114 itself (and/or the hash of the model 114) and/or any specification on how it can be used. (5) A 'test procedure indicator', for example, comprising a set of descriptions for any auxiliary processing that goes along with the main data pipeline such as a series of tests to check that data remains within a valid range. (7) An 'incremental learning procedure indicator', for example, comprising any specification on incremental learning that can be applied to the ML model 114 such that it can be customized for a given computing device 102 (for example, in response to input from a user that may act as a label). (8) A 'distributed learning procedure indicator', for example, comprising any specification on distributed learning that may be applied at the network edge such that given an accurate label, a learning procedure can be applied to the weights of the ML model 114 and these shipped back to the cloud 104 to help refine the overall model.

This additional information may specify how the computing device 102 is to be set up and/or how to operate a data processing pipeline for executing the ML model 114. In other similar words, the additional information may provide a way for the third party entity (e.g., service provider or owner of the ML model 114) to define how the ML model 114 is to be executed by the computing device 102.

In some examples, the ML model 114 comprises an ML model definition (e.g., a hash of the ML model type, any hyper-parameters and/or the weights of model data).

In some examples, the additional information (e.g., a model contract) may define the expected data flows (e.g., data sources, transformation paths and security properties) that are acceptable to the third party entity in use of the ML model 114 by the computing device 102. In some examples, the ML model 114 may indicate a choice available to the computing device 102 for adapting its particular hardware architecture to execution of the ML model 114.

In some examples, the additional information may comprise any incremental learning properties, such as predefined boundaries within which certain model parameters may lie or performance specifications (e.g., # alerts, performance on given test samples, etc).

In some examples, the additional information may comprise a test property (e.g., a test to be performed on model load and/or acceptable performance thresholds resulting from such a test). In some examples, the test property may be used for monitoring or controlling the execution of the ML model 114 when incremental learning is implemented. In some examples, the test policy may comprise an input, associated output and acceptance criteria to determine whether the output is sufficiently in line with what is expected for the given input. In some examples, a test could also be run on data coming through the data pipeline to validate data input measurements (e.g., sensor readings) are within 'normal' or 'expected' levels. In some examples, the test property may be a separate data structure defined by a party (e.g., other than the owner or controller of the ML model 114 such as a service provider) relying on the inference result.

In some examples, the additional information may comprise a definition of an attestation to be produced by the computing device 102. For example, a root of trust such as a trusted platform module (TPM) installed on the computing device 102 may be used to attest to certain measurements or values associated with the computing device 102. The additional information may specify how the attestation is to be produced and/or the content of the attestation. Certain features of attestations produced by the computing device 102 are described in more detail below.

In some examples, the additional information may comprise a public key associated with a service (e.g., from the third party entity) that can request results from the model such that the results generated by the computing device 102 can be encrypted under the public key and then accessed by an owner of the public key via a corresponding private key. In some example, such results may be included as part the attestation mentioned above.

In some examples, the OS 116 comprises load model instructions 116b to cause the computing device 102 to load the ML model 114 so it can be used. The computing device 102 may give a handle back to the calling process so that it can request use of the ML model 114. As mentioned above, in some examples, the ML model 114 may be accompanied with the additional information to facilitate setting up the computing device 102 in accordance with any definitions or specifications provided by the additional information.

In some examples, the OS 116 comprises send/use result instructions 116c to send or use certain information yielded by using the computing device 102. For example, the send/use result instructions 116c may define how the computing device 102 is to handle a result generated by execution of the ML model 114 and/or data collected by the computing device 102.

In some examples, the send/use result instructions 116c comprise upload model instructions, which may be implemented where training or incremental training is implemented by the computing device 102. For example, the training or incremental learning may update the ML model 114 so that an updated ML model 114 is produced. This updated ML model 114 may be stored in the memory 112 and/or uploaded to the cloud 104.

In some examples, the send/use result instructions 116c comprise data request instructions where data being used for training an ML model 114 at the cloud 104 may download a data collection specification or contract from the cloud 104 to define the expected data processing path that the data is to go through at the computing device 102. An attestation as to the actual data processing path used may be linked to the data used for the training. The data request instructions may define an expected lineage for the data that the cloud service has collected, which may protect against poisoning of the training set.

In some examples, the send/use result instructions 116c comprises model results and attestation request instructions to allow model execution results along with an attestation to be requested for a given service. In some examples, these instructions may obtain a nonce from the requester (e.g., the third party entity such as a service provider) to demonstrate the freshness of the attestation and/or specify the time over which a sequence of model results have been obtained and/or the regularity over which the results are to be sent to the requesting service (e.g., due to the requester receiving the expected nonce with the results). The request may be accompanied with a public key (e.g., validated against the additional information content such as a model contract) such that a message can be securely sent from the computing device 102 to the service relying on the results and/or attestation. Thus, the OS 116 may not have any visibility as to the results and/or the attestation due to this cryptographic control, even though the results may be handled by the OS 116. As will be explained in more detail below, the architecture of the computing device 102 may facilitate this cryptographic control to avoid exposing the ML model 114 to the OS 116 or certain other entities of the computing device 102 which may not necessarily be trusted by the third party entity.

In some examples, the send/use result instructions 116c comprise additional data request instructions to allow a data flow defined by the content of the additional information (e.g., model contract) to obtain additional data (e.g., from a user) of the computing device 102 and/or to send a request to the cloud 104 for enrichment data used by the ML model 114.

The cloud 104 may therefore possess or receive data such as training data (e.g., from the computing device 102 itself or another source). The cloud 104 may be trusted by the third party entity that owns the ML model 114 and at least part of the ML model 114 may be stored in and accessible from the cloud 104. The cloud 104 may store the additional information and/or implement cryptographic controls for ensuring the integrity of the ML model 114 and/or the additional information. The cloud 104 may be under the control of the third party entity or at least be trusted by the third party entity.

In some examples, in order to execute the ML model 114, the computing device 102 further comprises a transformation module 118 and an ML module 120. The transformation module 118 and the ML module 120 are depicted as separate modules in FIG. 1, however in some examples they may be implemented as part of the same module of the computing device 102. Further, in some examples, any of these modules 118, 120 may be implemented as a series of modules. In some examples, the transformation module 118 may process input data (e.g., raw data) to generate data suitable for use by the ML module 120 (e.g., for running the ML model 114 on such data).

In some examples, the transformation module 118 may perform a transformation on raw data obtained by at least one of the data sources 108. Examples of transformation comprise: feature selection, one-hot feature encoding, differencing over time, generating summary statistics to more complex signal processing such as filtering, fast Fourier transform (FFT) and/or wavelet transformations. In some examples, a feature quality assessment process may be implemented by the computing device 102 to detect outliers or features that do not conform to a physical model underpinning expected data from a sensor.

In some examples, managing a transformation by the transformation module 118 may comprise buffering data (e.g., from sensors) until a sufficiently long window of data has been collected; and/or where data from multiple sources is being collected, waiting until all the corresponding data has been obtained prior to execution the ML model 114.

In some examples, the ML module 120 comprises an ML engine such as an AI accelerator or other dedicated ML processing device to execute an ML model 114 training and/or inferencing procedure. Depending on the technology used, the ML module 120 may not be able to keep an entire ML model 114 (e.g., a deep neural network (DNN) implemented by an accelerator) loaded at one time and therefore, in some examples, the ML model parts 114a-N (which may collectively make up the entire ML model 114) may be selectively loaded to the ML module 120 as and when needed.

The transformation module 118 and the ML module 120 may be implemented by processing circuitry (e.g., in the form of a dedicated chip on the computing device 102 platform or via use of a processing and/or memory resource implemented by the computing device 102 such as the CPU 110 and/or memory 112). Examples of processing circuitry for implementing the functionality of the transformation module 118 and the ML module 120 comprise: a dedicated processor such as an application specific integrated circuit (ASIC) (e.g., an artificial intelligence (AI) ASIC), a field programmable gate array (FPGA) device, a graphics processing unit (GPU) and/or the CPU 110 of the computing device 102 platform. The transformation module 118 and the ML module 120 may comprise or have access to memory (e.g., dedicated/local memory that is part of the module 118/120 itself or another dedicated or non-dedicated memory accessible to the module 118/120 such as the memory 112) for storing instructions which, when executed by the processing circuitry of the module 118/120, cause the processing circuitry to implement the instructions.

The instructions may be for implementing the functionality of the transformation module 118 and the ML module 120 may be pre-programmed. In some examples, the instructions may be configured or updated to provide a specified functionality (e.g., to execute a certain ML model 114 in the manner specified by the additional information received from the third party entity).

The components of the computing device 102 may define certain trust boundaries. For example, processing circuitry associated with the transformation module 118 and/or ML module 120 may define a trust boundary with respect to the computing device 102. For example, these components may be physically separate components such as accelerators or secure enclaves.

The computing device 102 further comprises a control module 122 and an attestation module 124. In this example, the control module 122 and attestation module 124 are depicted as separate modules although in other examples, they may form part of the same module.

In some examples, the control module 122 and/or attestation module 124 may be implemented as a hardware module (e.g., a dedicated processor such as an ASIC, FPGA, etc. comprising processing circuitry for implementing certain modules or instructions to implement the functionality of the control module 122 and/or attestation module 124). In some examples, a (trusted) general purpose processor with access to suitably stored instructions (e.g., securely stored instructions) may be used to implement the functionality of the control module 122 and/or attestation module 124. In some examples, certain functionality implemented by the control module 122 and/or attestation module 124 may be supported by a trusted platform module (TPM) or other root of trust.

The control module 122 is in a control plane of the computing device 102. The control module 122 may be communicatively coupled to certain components of the computing device 102 and may be trusted (by a third party entity) to monitor, configure these components and/or set up a data path between the components.

In the example of FIG. 1, and as represented by the thin connecting lines in FIG. 1, the control module 122 is connected to the data sources 108, CPU 110, memory 112, OS-based software 116, transformation module 118, ML module 120 and attestation module 124. In addition, the control module 122 may be set up to monitor and/or configure a data plane defining a data processing pipeline (as represented by the thick connecting lines in FIG. 1) of the computing device 102. Thus, in this example, the control module 122 may set up and/or monitor the data processing pipeline(s) between the data sources 108, CPU 110, memory 112, transformation module 118, ML module 120, the attestation module 124 and the OS-based software 116.

In this example, upon the ML model 114 being loaded to the ML module 120, the data path may extend between the data source 108 and the cloud 104 whereby, in use of the computing device 102, data passes from the data source 108 to the cloud 108 via the transformation module 118, ML module 120, attestation module 124 and OS-based software 116. In another example, the OS-based software 116 may be bypassed by using, for example, an NIC to send the data from the attestation module 124 directly to the cloud 104.

In some examples, the additional information provided with the ML model 114 when it is fetched from the cloud 104 may define the data processing pipeline that is to be set up in the computing device 102 to execute the ML model 114. Thus, in some examples, the control module 122 may set up and/or enforce the data processing pipeline as defined by the additional information.

In some examples, the control module 122 may be set-up to control certain components of the computing device 102 by, for example, determining physical data connections between the components, sending instructions to certain components to ensure that the component operates in a specified manner and/or monitoring the operation of the OS 116 to ensure that data is not distributed and/or altered in a non-permissible manner in the computing device 102 based on instructions issued by the OS 116. In any of these examples, the control module 122 may establish whether or not the data path can be trusted or changed in some way by another component (e.g., the OS 116) of the computing device 102 and/or enforce that the data path remains in an appropriate condition for maintaining trust in the computing device 102.

In some examples, the control module 122 may be set-up to prevent other components of the computing device 102 and/or the OS 116 from interfering with the data path and configured components (e.g., the data source 108, transformation module 118 and/or ML module 120). For example, the control module 122 may ensure that it configures the functions of certain components such as the transformation module 118 and ML module 120 so that the data path between these modules and other components of the computing device 102 correspond to what is expected by a third party entity such as a service provider.

In some examples, the control module 122 may provide information about the status of the data plane, e.g., the state of the transformation module 118, ML module 120 and/or the attestation module 124. The control module 122 may provide a mechanism for the attestation module 124 to record and attest to the ML model 114 being used for a decision along with control path data showing the provenance and lineage of the data in the data processing pipeline.

The description of the control module 122 and attestation module 124 given above provides certain examples of how to implement the functionality of these modules. Further example implementations for the control module 122 and attestation module 124 are given below.

In some examples, it may be assumed that there is control over the hardware design (e.g., and trusted by the service provider) of the computing device 102 such that the control module 122 may be configured, upon manufacture of the computing device 102, to have control over the hardware components and the corresponding data channels between these components.

In some examples, the control module 122 may configure a bus between various components so that data is transferred from one component to the next component and is not interfered with by other components within the system (including software running on the OS 116) during this data transfer.

In some examples, the control module 122 may configure a memory controller of the computing device 102 to restrict access to memory pages of the memory 112 containing an unencrypted ML model 114 or partial ML model 114 and/or memory pages used to transfer data between various data sources 108 of the computing device 102.

In some examples, an encryption-protected channel may be configured between certain components of the computing device 102 to protect data transferred between these components. For example, certain keys (e.g., a public-private key pair or a symmetric key) may be set up between certain components and the control module 122 so that data is sent in an encrypted format between the components. For example, the control module 122 may be able to send a key to certain components such that when data encrypted under that key is transmitted between those components, it may remain secure until it is decrypted (if needed) by another component which is in possession of the relevant key to decrypt the data. Whether to use a symmetric or asymmetric cryptography may depend on the trust level between the control module 122 and the various components of the computing device 102. In some examples, the control module 122 may issue a session key for secure communications between the components over an unsecured data channel in the computing device 102. In some examples, the integrity of the data being transferred may be protected through a message authentication code (MAC), signature and/or through use of authenticated encryption.

In some examples, process protection may be implemented to ensure that certain process elements (e.g., the transformation module 118, ML module 120, control module 122 and/or attestation module 124) for executing the ML model 114 could be implemented in different ways depending on the hardware architecture. For example, certain hardware accelerators may be used such as an ML-based accelerator. In some examples, process isolation techniques may be used such as running certain processes within a secure enclave and/or within a secure virtual machine protected by a hypervisor.

Some functionality of the attestation module 124 is now described.

The attestation module 124 may interact with the control module 122 to generate attestations (or 'attestation statements'). These attestations may provide certain information to be used by a third party entity such as a service provider or a user of the computing device 102. For example, the attestations may provide an output or result of executing the ML model 114 and/or new model weights obtained when performing training or inferencing using the ML model 114. Further information regarding the functionality of the attestation module 124 is given below. In some examples, the attestation statement may bind the result of executing the ML model 114 with information about the setup of the computing device 102, the ML model 114 and/or an indication of data provenance/lineage. The attestation statement provided by the attestation module 124 may ensure that the service provider can determine such information from the attestation statement.

In some examples, a service (e.g., a third party entity such as a service provider) relying on the results of an ML model 114 may issue an attestation request (e.g., which is received by the OS 116 from the cloud 104) to cause an attestation to be generated by the attestation module 124, for example, with the results for a certain number of model inferences and/or for a certain time window. In some examples, this request may be accompanied by a nonce and/or a public key associated with the service. In this example, the results from executing the ML model 114 and the attestation process are encrypted with the public key and the nonce is returned in the attestation statement. In this manner, the service may decrypt the results using its own private key and recognize whether the nonce is as expected for the time it was sent to the computing device 102.

In some examples, the attestation module 124 may generate a new attestation every x inferences with the attestation module 124 and/or may generate a new attestation upon the control module 122 generating a hash chain of results recorded by the control module 122 over the time frame for acquiring the set of results making up the hash chain prior to attestation. In some example, an attestation may be generated on request and/or as a result of power cycle operations.

In some examples, the attestation may be handled by the OS 116 for storage in the memory 112 and/or send to a requesting entity via the cloud 104.

As mentioned above, cryptographic protocols may be used to securely transmit data. In some examples, a public-private key pair may be used by the system 100, although in some examples, the same key could be used (e.g., if the key can be distributed between different entities/components securely).

In some examples, it can be assumed that the keys are placed in the computing device 102 and certified as keys belonging to the control module 122 and/or attestation module 124. Where the control module 122 and/or attestation module 124 is supported by a TPM, the TPM may have a function to facilitate cryptographic protocol mentioned above (e.g., to store and/or generate a key for use in securing the data in the data path and/or control plane). In some examples, the TPM may provide a key management functionality and may include a signing function. The formatting of the attestation statements may be performed outside of the TPM (e.g., by the control module 122 and/or attestation module 124) unless, in some examples, the TPM functionality is extended to cover such formatting functionality.

In some examples, a key may be certified as belonging to a given manufacturer's control module 122 and/or attestation module 124 where the certification restricts their use to, for example, receiving, loading or otherwise using ML models 114 and/or signing attestation statements. These keys may be replaceable based on a suitable protocol, for example, similar to that used by a TPM privacy Certification Authority.

The architecture of the computing device 102 may allow a third party entity to use the computing device 102 to execute an ML model 114 owned by the third party entity rather than using processing resource (e.g., the cloud 104) controlled by the third party entity. By implementing the architecture of the computing device 102 (e.g., by using the control module 122 and/or attestation module 124), the third party entity may be able to protect their ML model 114 and/or inference results while also securing the data in the data path, reduce lag, reduce network bandwidth usage/costs and/or reduce privacy concerns for a service user, for example, with regards to transmitting data obtained at the computing device 102 and transmitted over the network 106. The computing device 102 may be at or near a network edge and certain apparatus, machine readable media and/or methods described herein may facilitate implementing the ML model 114 at the network edge while ensuring that the use of the computing device 102 satisfies certain needs of the service user and service provider.

The following examples describe certain apparatus, machine readable media and/or methods which may facilitate the architecture described above. Where appropriate, reference is made to the system 100 of FIG. 1.

Controlling Execution of an ML Model

A third party entity such as a service provider that uses an ML model 114 as part of the service offered may deliver a package comprising the ML model 114 and associated instructions for data acquisition and/or pre-processing to ensure that the ML model 114 may be correctly handled by the computing device 102. The computing device 102 described in FIG. 1 defines separate control and data planes along with a trusted control module 122 in order to control execution of an ML model 114.

In some examples, ML models may be designed with a certain data processing pipeline in mind where data is taken from particular sensors (e.g., data sources 108), potentially combined, and then passed through a series of pre-processing and feature extraction prior to reaching the ML module 120. When a service is running in the cloud 104, it may be straightforward for the service provider who created the ML model 114 to ensure that the correct data pipeline and ML model 114 is used. However, where the ML model 114 is sent to the edge (or at any device not under control of the service provider) and a service provider executes an ML model 114 on an end-point computing device 102, the service provider may have certain queries about the execution of the ML model 114.

In some examples, the service provider may query whether the correct data pipeline is set up. In some examples, the service provider may query whether there are any guarantees that the pipeline is to be set-up on the computing device 102 in a way that avoids interference to the data flow from other processes running on the computing device 102. In some examples, the service provider may query whether the data pipeline can be customized according to the edge device and its hardware properties. For example, different computing devices 102 may be heterogeneous and comprise a range of different sensors which may produce data with different pre-processing properties in order to make it suitable for execution by the ML model 114. In another example, different computing devices 102 may have different platform properties that involve different protections of the data flow.

Thus, the control module 122, attestation module 124 and the associated architecture described in relation to FIG. 1 may support the needs of the service provider and/or the service user. As will be described below, certain apparatus, machine readable media and methods may refer to certain components of the system 100 and/or the interaction between certain components.

Figure 2:
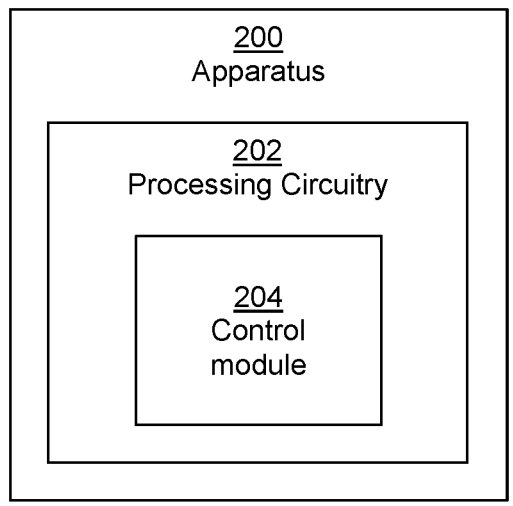
FIG. 2 is a simplified schematic illustration of an example apparatus for implementing part of the example system of FIG. 1.

FIG. 2 shows a schematic illustration of an example apparatus 200 for implementing at least part of the system 100. In this example, the apparatus 200 implements certain functionality of the control module 122, for example, with respect to certain functionality of the attestation module 124. The apparatus 200 comprises processing circuitry 202 (e.g., which may implement other functionality such as implemented by other methods or machine readable media described herein). In this example, the processing circuitry 202 comprises a control module 204 (e.g., corresponding to the control module 122 of FIG. 1).

In use, the control module 204 is to determine whether a computing device 102 communicatively coupled to the control module 204 is in a specified state for executing a machine learning model controlled by a third party entity. For example, the system 100 shows the control module 122 provided as part of the computing device 102 and is therefore communicatively coupled to certain modules of the computing device 102 (e.g., the components relating to executing the ML model 114). In some examples, the specified state may refer to the control plane set-up of the computing device 102 and/or the data processing pipeline implemented by the computing device 102. For example, the service provider may need the computing device 102 to be in the specified state (e.g., as specified by the 'additional information' described previously) in order to trust the computing device 102 to execute its ML model 114.

In response to determining that the computing device 102 is in the specified state, the control module 204 sends, to an attestation module 124 in a data processing pipeline associated with the computing device 102, an indication that the computing device 102 is in the specified state.

In some examples, the indication may comprise measurements obtained from a component of the computing device 102 or other information that can be used by the attestation module 124 when attesting to the set-up of the computing device 102. In some examples, the indication may be explicit information regarding the data processing pipeline set-up of the computing device 102. In some examples, the indication may provide an implicit indication that the computing device 102 is in the specified state, for example, by confirming whether the computing device is in the specified state without providing any data to provide direct evidence that the computing device 102 is in the specified state.

In some examples, the apparatus 200 has the task of setting up the computing device 102 for a given ML model 114. In these terms the ML model 114 may be associated with a contract (e.g., 'additional information') regarding how the ML model 114 can be used.

In an example, an ML model 114 for performing image recognition on a video stream may come with a model contract (e.g., within the 'package' from the service provider) specifying certain conditions that are to be satisfied by the computing device 102 and enforced by the apparatus 200. For example, the following conditions may be specified for an example image processing model contract: (1) The camera (e.g., a 'data source') is to be streamed directly to the transformation module 118. (2) The transformation module 118 is to perform some image processing to 'normalize' and/or down scale the image (e.g., using a particular code set identified by hash, or name and signer). (3) The transformation module 118 is to stream the resulting (normalized) image data to the ML model 114 loaded in the ML module 120. (4) A specification that additional tests and/or ML models through which the data is to be run to validate the form of the data. For example, a test that calculates and reports on lighting levels within the image. (5) A specification as to whether incremental learning could be applied to the ML model 114 and if so where targets are obtained from (e.g. user input). (6) A specification that attestation is to be or can be applied to the ML model 114 and/or the form of the attestation to be provided by the attestation module 124. (7) A statement regarding a set of public keys of service(s) authorized to receive model results where the public key is to be used by the attestation module 124 to encrypt the results and attestation statement and/or a statement of a randomly generated symmetric key used to encrypt the results.

In some examples, the apparatus 200 may have a key that is associated with the computing device 102 platform and can be used to deliver an encrypted model. Thus, the apparatus 200 may decrypt the ML model 114 and use the control channels to set up the data flow in accordance with the model's contract. Further, the apparatus 200 may manage the flow of data through the ML model 114, for example, including where the whole model cannot fit within the ML module 120 at any given point as well as providing control information (e.g., as provided by the functionality of the apparatus 200) to the attestation module 124 such that it can produce accurate attestation statements.

In some examples, the apparatus 200 may ensure that incremental learning processes work correctly, and that data can be collected according to the data collection contract mentioned above.

In some examples, the apparatus 200 communicates with the service provider via the cloud 104. Such communication may be facilitated by using the OS 116 as a proxy but in a way that is secure from interference. In some examples, the apparatus 200 could be directly connected to a network or have an associated network component (e.g., an NIC) for communicating with the cloud 104. This set-up may be useful if an ML model 114 needs to be run and the results communicated when the computing device 102 is in standby (as defined by the OS 116) and the main CPU 110 is not running.

In some examples, the implementation of the apparatus 200 (and indeed other apparatus, machine readable media and methods described herein) may provide a trustable way of ensuring a computing device 102 such as at the edge of a network and outside of the control of a service provider enforces that data feeding into an ML model 114 is from the expected data source and/or pre-processed in the correct manner. Accordingly, in some examples, the apparatus 200 (and, in some examples, other apparatus, machine readable media and methods described herein) may ensure that endpoint devices can be trusted to correctly run an ML model 114 as intended by a third party entity such as service provider, which may satisfy certain needs of the service provider and/or service user.

In some examples, the apparatus 200 (and indeed other apparatus, machine readable media and methods described herein) may facilitate multi-tenant models and/or multi-tasking using the computing device 102. In some examples, multi-tenancy may refer to being able to support multiple ML models 114 and context switches between the multiple ML models 114. Within the model load process, an ML model 114 may be loaded to an internal context and comprise a 'loaded and validated' version of the ML model 114 that is secured for the computing device 102. Such loading may provide a basis for multi-tasking and/or running multiple models so that if the computing device 102 has a number of loaded model contexts then it can switch between the different ML models 114 (e.g., by accessing different ML models 114 stored in the memory 112, for example, with reference to a model table stored in the apparatus 200/ control module 122). In some examples, the context may be associated with the certification of results (e.g., storing partial results and previous model results) and/or the maintenance of the ML model 114 (e.g., weights and setup).

In some examples, in response to determining that the computing device 102 is not in the specified state, the control module 204 is to send an instruction to the computing device 102 to set-up the computing device in accordance with the specified state.

In some examples, the control module 204 is to verify a signature applied to the machine learning model 114 and/or an associated model specification (e.g., in the 'additional information') by the third party entity (e.g., service provider) against a public key associated with the third party entity. The control module 204 is to provide verification that the signature matches the public key via the indication. Thus, in some examples, the control module 204 verifies that the ML model 114 is from the third party entity (since it was signed by that entity) and then indicates for the attestation module 124 that the computing device 102 is executing the correct ML model 114 from the correct entity. In some examples, in response to determining that the computing device 102 is in the specified state (e.g., that the computing device 102 has the appropriate hardware and/or software components specified under the associated model specification) and that the machine learning model and/or associated model specification is verified against the public key associated with the third party entity, the control module 204 may indicate, via the indication, that the machine learning model can be executed by the computing device 102.

In some examples, the model load process (e.g., as implemented by the load model instructions 116b) may validate the ML model 114 and the model contract given the signature by the third party entity. The signature may imply that the integrity of the ML model 114 and associated contract have been checked against the public key (either in a supplied certificate or supplied otherwise). This information may be placed in the attestation statement by the attestation module 124.

In some examples, the model load process may check the model contract to ensure that it can be enforced. For example, if the model contract expects a direct link to a camera then the apparatus 200 may check that a camera is linked and/or that an appropriate level of control can be applied to the camera. If the model contract cannot be maintained, then it may be rejected or an indication may be sent by the apparatus 200 to the third party entity to inform that the computing device 102 does not comply with the model contract. The model contract may comprise different valid options and in this case the model load process may record which options are selected, and may include such selected options in the attestation (via the indication sent from the control module 204 to the attestation module 124).

In some examples where the ML module 120 is a hardware module the load process may split the model 114 into portions in memory such that the OS 116 may be unable to read or change those portions of the model 114. Then, as the inferencing process proceeds, the control module 204 may ensure that the ML module 120 is mapped to the correct portion of the model 114 and that the input flows correctly, or as expected, through the ML model 114.

Figure 3:
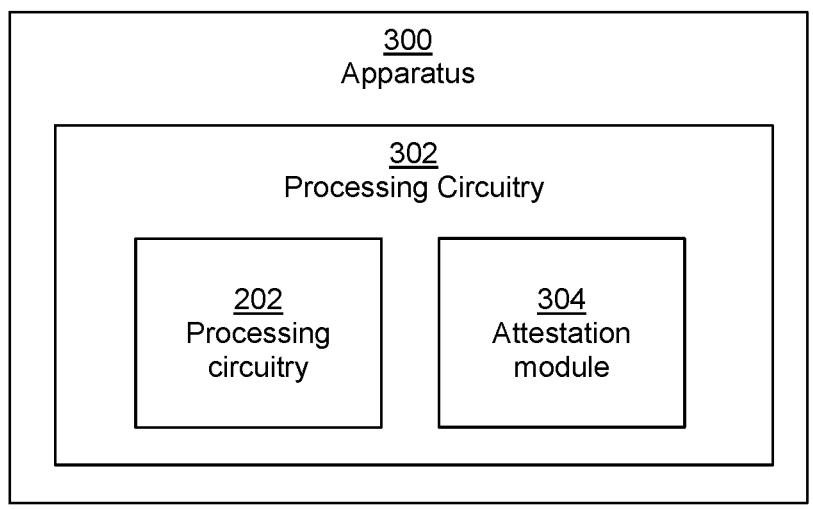
FIG. 3 is a simplified schematic illustration of an example apparatus for implementing part of the example system of FIG. 1.

FIG. 3 shows a schematic illustration of an example apparatus 300 for implementing at least part of the system 100. In this example, the apparatus 300 implements certain functionality of the control module 122 and the attestation module 124. The apparatus 300 comprises processing circuitry 302 (e.g., which may implement other functionality such as implemented by other methods or machine readable media described herein). In this example, the processing circuitry 302 comprises the processing circuitry 202 of FIG. 2 and an attestation module 304 (e.g., the attestation module discussed in relation to FIG. 2 and corresponding to the attestation module 124 of FIG. 1).

In this example, the attestation module 304 is to attest to the computing device 102 being in the specified state by sending a signed statement comprising the indication to the third party entity. The attestation module 304 may comprise or have access to a private key belonging to the attestation module 304 which is used to sign the statement generated by the attestation module 304.

In some examples, any of the modules described above (e.g., the control module 204 and/or attestation module 304) may comprise at least one dedicated processor (e.g., an application specific integrated circuit (ASIC) and/or field programmable gate array (FPGA), etc) for implementing the functionality of the module. In some examples, the functionality of any of the modules described above may be supported by a TPM.

In some examples, the module (e.g., the control module 204 and/or attestation module 304) may comprise at least one processor for implementing instructions which cause the at least one processor to implement the functionality of the module described above. In such examples, the instructions may be stored in a machine-readable medium (not shown) accessible to the at least one processor. In some examples, the module itself comprises the machine-readable medium. In some examples, the machine-readable medium may be separate to the module itself (e.g., the at least one processor of the module may be provided in communication with the machine readable medium to access the instructions stored therein).

Figure 4:
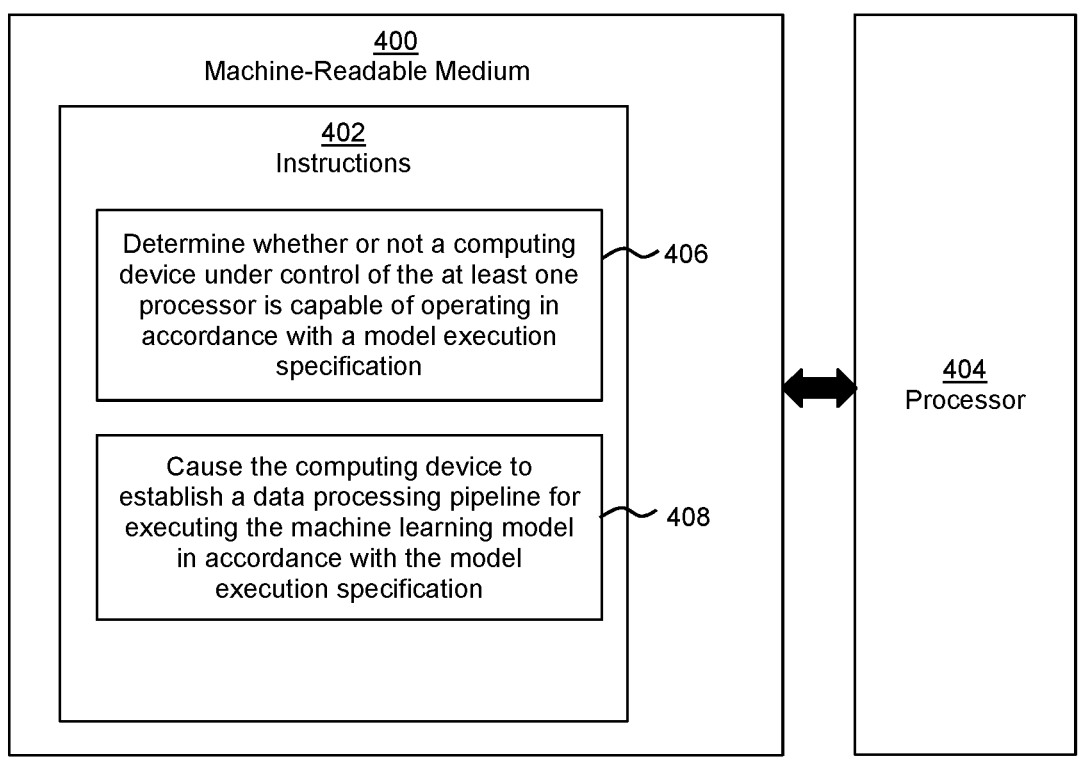
FIG. 4 is a simplified schematic illustration of an example machine-readable medium associated with a processor.

FIG. 4 schematically illustrates a machine-readable medium 400 (e.g., a tangible machine-readable medium) which stores instructions 402, which when executed by at least one processor 404 (e.g., processing circuitry of the control module 122), cause the at least one processor 404 to implement the functionality of certain parts of the system 100 (e.g., the control module 122, including its interaction with other components of the system 100). The instructions stored on machine readable medium 400 may, when executed on the at least one processor 404, implement the same or similar functionality as the apparatus 200, 300 (e.g., where the instructions are to implement the modules described in relation to these apparatus 200, 300).

In this example, the machine-readable medium 400 may set-up the computing device 102 (e.g., to set-up the data processing pipeline in accordance with the model contract described previously).

The instructions 402 comprise instructions 406 to determine whether or not a computing device 102 under control of the at least one processor 404 is capable of operating in accordance with a model execution specification (e.g., in the 'additional information') associated with a machine learning model 114 under control of a third party entity.

In response to determining that the computing device 102 is capable of operating in accordance with the model execution specification, the instructions 402 comprise instructions 408 to cause the computing device 102 to establish a data processing pipeline for executing the machine learning model in accordance with the model execution specification. For example, the instructions 408 may cause the at least one processor 404 to control the control plane of the computing device 102 in order to set up the data processing pipeline as specified by the third party entity (via the model execution specification).

Figure 5:
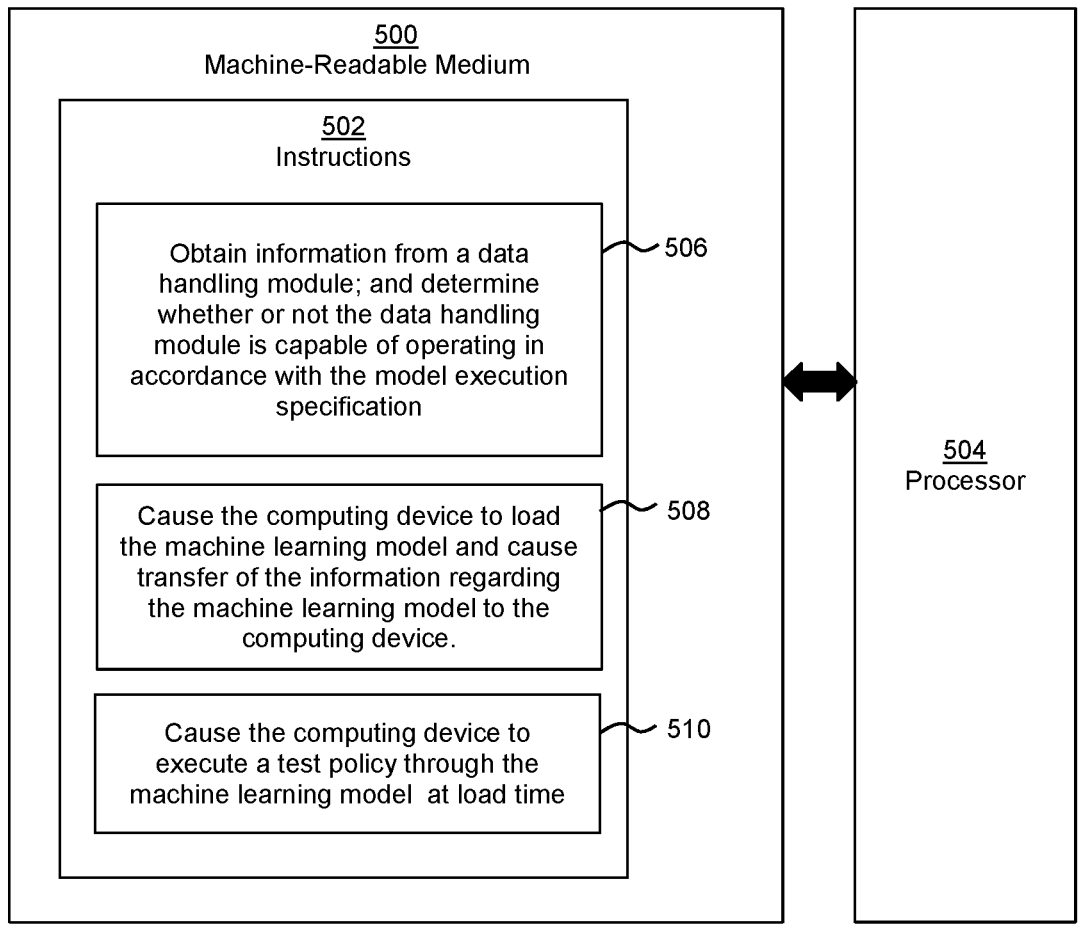
FIG. 5 is a simplified schematic illustration of an example machine-readable medium associated with a processor.

FIG. 5 schematically illustrates a machine-readable medium 500 (e.g., a tangible machine-readable medium) which stores instructions 502, which when executed by at least one processor 504 (e.g., processing circuitry of the control module 122), cause the at least one processor 504 to implement the functionality of certain parts of the system 100 (e.g., the control module 122). The instructions stored on machine readable medium 500 may, when executed on the at least one processor 504, implement the same or similar functionality as the apparatus 200, 300 (e.g., where the instructions are to implement the modules described in relation to these apparatus 200, 300). In some examples, the instructions 502 may be implemented in conjunction with the instructions 402. In some examples, certain instructions of the instructions 502 may be omitted or a set of the instructions may be performed in any appropriate order.

In some examples, the instructions 502 comprises instructions 506 to obtain information from a data handling module of the computing device 102 in the data processing pipeline regarding a state of the data handling module; and determine whether or not the data handling module is capable of operating in accordance with the model execution specification. The data handling module handles data in the data processing pipeline, for example, data input and/or output from the data handling module. The data handling module may refer to a component of the system 100 that handles data in the data processing pipeline and/or is monitored or controlled by the control module 122. For example, the data handling module may comprise a data input module (e.g., data source 108); a data transformation module (e.g., transformation module 118); and/or a machine learning module 120.

In some examples, the instructions 502 comprise instructions 508 to cause the computing device 102 to load the machine learning model 114 by setting up a communication channel between a memory (e.g., memory 112) storing information regarding the machine learning model 114 and the computing device 102 (e.g., the ML module 120). Further, the instructions 508 are to cause transfer of the information regarding the machine learning model to the computing device 102. For example, the instructions 508 may control the transfer of the ML model 114 (whether encrypted or not) from the memory 112 to the ML module 120.

In some examples, the instructions 502 comprises instructions 510 to cause the computing device 102 to execute a test policy through the machine learning model 114 at load time to determine whether or not the computing device 102 is set up in accordance with the model execution specification.

The test policy may be defined with the additional information, e.g., received as part of the package from the third party entity.

In some examples, in addition to loading the ML model 114 the test policy may be run through the model at load time to ensure that acceptance criteria may met. In some examples, the test policy may refer to test samples being executed by the ML module 120 and corresponding acceptance criteria. In some examples, running the test policy may be useful when incremental learning is being used on an ML model 114 and a test set may validate that the ML module 120 is still performing its specified function.

In some examples, where a relying party other than the model issuer (e.g., the third party entity) wants to rely on the results of the ML model 114, then the model issuer may define their own test set. Then, in some examples, the validation against a test set at load time may be provided as an additional field in an attestation statement generated by the attestation module 124.

In some examples, as results are produced or incremental model changes due to execution of the ML model 114 and/or a test model, the control module 122 may need to cache these results prior to attestation and/or folding model changes back into the model 114 to adapt the model 114 supplied by the third part entity. In some examples, the control module 122 may decide to maintain the adapted model 114.

In some examples, when setting up the control paths for a given inference model, the control module 122 may need to set up a feature extraction/transformation process (e.g., by controlling the transformation module 118) that operates on the data input prior to passing the data input to the ML module 120. In some examples, this process may involve the control module 122 performing any setup of the transformation module 118, then the control module 122 finding, validating (e.g., against the model contract) the code that runs, setting any parameters, and then ensuring that the input data is directed through the transformation module 118 correctly as inferences occur during execution of the ML model 114.

In some examples, a model package (e.g., comprising a model contract) signed by a model provider (e.g., service provider or other third party entity) may have a number of restrictions that the model provider expects the control module 122 to abide by such as the data flows. Examples of such restrictions may be that the ML model 114 can be used for incremental learning; that is the ML model 114 may be trained further based on operational data given corrections that may come from the way the model is applied.

In some examples, a channel may be set up by the control module 122 to receive training inputs from the wider system (for example, from input from a user). In addition, in some examples, the model 114 may change and the control module 122 may maintain a secure state for the ML model 114 so that between uses it knows that the model 114 has the correct current version of the model 114. In some examples, maintaining a secure state may involve attesting to the latest version of the model based on the model contract being enforced along with the control module 122 securely storing a counter (e.g., in a local memory of the control module 122) that reflects the latest update of the model 114.

In some examples, the control module 122 may store and aggregate the model 114 changes that occur, for example, due to inferencing and update the model 114 periodically or on request from the service provider rather than every inference cycle.

The apparatus 200, 300 and machine readable media 400, 500 described above refer to functionality corresponding to the control module 122 and/or attestation module 124 of the computing device 102, and include references to a third party entity such as a service provider.

Figure 6:
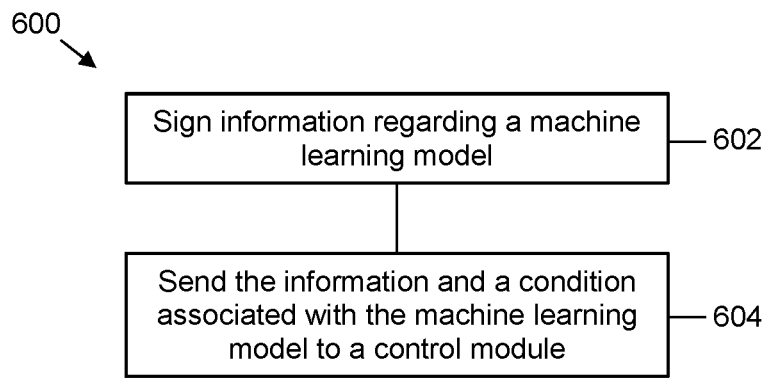
FIG. 6 is a flowchart of an example method for implementing part of the example system of FIG. 1.

FIG. 6 shows a flowchart of an example method 600 for implementing certain functionality of the third party entity. Thus, the method 600 may be implemented at a third party device such as a server controlled by the third party entity (e.g., at or accessible via the cloud 104). Reference is made to certain components of the system 100 depicted by FIG. 1.

The method 600 comprises, at block 602, signing information regarding a machine learning model 114 using a private key associated with an owner (e.g., the third party entity) of the machine learning model 114. The information may refer to at least part of the ML model 114 itself.

The method 100 further comprises, at block 604, sending the information and a condition associated with the machine learning model 114 to a control module 122 in control of a computing device 102 for executing the machine learning model 114. The condition may specify how the computing device 102 is to set up a data processing pipeline for executing the machine learning model 114. The condition may refer to, for example, a model contract.

In some examples the condition contains certain information, for example, the 'additional information' described previously. In some examples, the information is signed and in other examples the information is not signed.

In some examples, the condition comprises: a description of a specified data processing pipeline for executing the machine learning model; an associated hash of the machine learning model 114; a test procedure indicator; an incremental learning procedure indicator and/or a distributed learning procedure indicator.

In some examples, the information and/or condition comprises a public key of a service provider authorized by the owner (of the ML model 114) to receive an encrypted result obtained by executing the machine learning model on the computing device 102. Thus, the public key of the authorized service provider may be used to encrypt the result/attestation from the attestation device so that the holder of the corresponding private key is the specified recipient that is able to decrypt the result/attestation.

Figure 7:
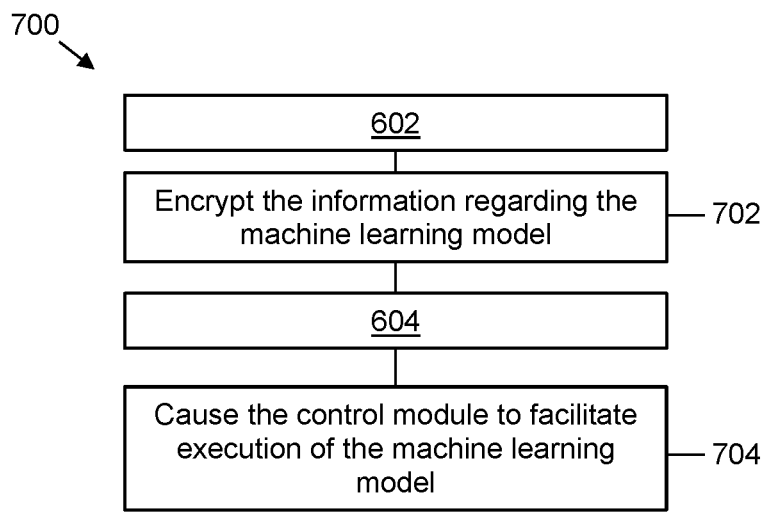
FIG. 7 is a flowchart of an example method for implementing part of the example system of FIG. 1.

FIG. 7 shows a flowchart of an example method 700 for implementing certain functionality of the third party entity. The method 700 comprises the blocks 602 and 604 and comprises further blocks as described below. Any combination of these blocks may be implemented in any appropriate order and, where appropriate, certain blocks may be omitted altogether.

In some examples, the method 700 comprises, at block 702, encrypting the information regarding the machine learning model 114 under a public key of the control module 122 prior to sending the information to the control module 122 (for example, directly or indirectly via the OS 116). Thus, the control module 122 may be able to decrypt the ML model 114 after it has been securely transmitted (e.g., via the OS 116) over the network 106 to the control module 122.

In some examples, the method 700 comprises, at block 704, in response to receiving an attestation that the computing device 102 complies with the condition, causing the control module 122 to facilitate execution of the machine learning model 114 by the computing device 102 in accordance with the condition.

In some examples, block 704 comprises, in response to the received attestation comprising an indication that the signed machine learning model 114 was verified against a public key associated with the private key, verifying whether or not the control module has set up the computing device 102 in accordance with the condition. For example, the attestation may contain information derived from the control module 122 to allow the service provider to determine whether the computing device 102 has been set up in accordance with the condition (e.g., by comparing the received attestation with the 'condition' specified by the third party entity).

The description of the control module 122 and other components given above refers to controlling the execution of the ML model 114 on the computing device 102. Certain examples given below refer to securing the ML model 114 with reference to the system 100 of FIG. 1.

Securing an ML Model

The control module 122 may also be used to secure the ML model 114, for example, to provide assurance to the third party entity that the ML model 114 is unlikely to be leaked or otherwise accessed by an attacker. Accordingly, in some examples, the control module 122 may allow an ML model 114 to be executed at or near the network edge whilst preventing other parties from gaining access to the ML model 114 owner's intellectual property (IP).

Service providers may invest a considerable amount of effort in developing ML models and as such may want to protect these ML models from becoming available in the public domain. Implementing the ML models in a cloud environment trusted by the service provider may reduce the risk of the ML model being leaked. Although a service user processing a model using their own computing device 102 may experience less communication lag and less network bandwidth usage/cost compared with implementing the ML model in the cloud environment, the service provider may not consider it appropriate to release their models to the service user at the network edge since they may not be able to monitor or control the security implementation at the computing device 102.

An attacker seeking to gain access to the model may use certain attack techniques to steal the model—for example finding it when stored on the computing device 102 or by looking at the memory of a process running the model. Other attack routes may be available where a model can effectively be recreated by running a series of queries on the model and using this to train a surrogate model. Such attacks could be hard to detect at the edge.

Where ML models are implemented on edge devices (or any device outside the control of the service provider) the IP associated with the ML model may not be readily protectable. Examples described herein provide a mechanism to ensure that the model can be encrypted from the service provider, protected at rest by trusted components and decrypted into protected areas (such as hardware accelerators, or adequately protected processes).

In some examples, the control module 122 and the associated architecture described in relation to FIG. 1 may support the needs of the service provider. As will be described below, certain apparatus, machine readable media and methods may refer to certain components of the system 100 and/or a manner of securing an ML model.

Figure 8:
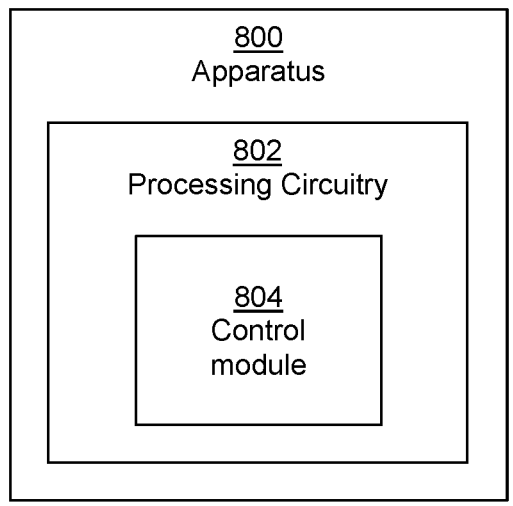
FIG. 8 is a simplified schematic illustration of an example apparatus for implementing part of the example system of FIG. 1.

FIG. 8 shows a schematic illustration of an example apparatus 800 for implementing at least part of the system 100. In this example, the apparatus 800 implements certain functionality of the control module 122, for example, to secure an ML model owned or controlled by a third party entity such as a service provider. The apparatus 800 comprises processing circuitry 802 (e.g., which may implement other functionality such as implemented by other methods or machine readable media described herein). In this example, the processing circuitry 802 comprises a control module 804 (e.g., corresponding to the control module 122 of FIG. 1).

In use of the apparatus 800, the control module 804 is to protect information regarding a machine learning model 114 owned by a third party such as a service provider, where the control module 804 is to protect the information in a memory (for example, the memory 112 or a dedicated memory associated with the control module 804) communicatively coupled to the control module 804. In response to receiving an indication that a computing device 102 under control of the control module 804 complies with a third party policy (e.g., the 'additional information' such as a model contract) associated with the machine learning model 114, the control module 804 is to release the information to a component of the computing device 102. For example, by releasing the information, the control module 804 causes the ML model 114 to be sent to, decrypted by or otherwise become accessible to the ML module 120.

In some examples, the control module 804 may be trusted since it is outside a trusted scope of the OS 116 and comprises an identity key pair (e.g., a public-private key pair). In some examples, the control module 804 may have responsibility for managing and storing the model on the computing device 102.

In some examples, the control module 804 has an identity (e.g., in the form of a public key that could be certified at manufacture) that can be used encrypt confidential data from the service provider (who holds an ML model 114 along with a model contract specifying how the model is to be used and any pre-processing code). The service provider may encrypt the ML model 114 (or at least part of the ML model 114) and associated data and send it to the control module 804 on the end-point—passing through an untrusted OS (which cannot read the data it handles).

On an initial load instruction, the control module 804 may create a model context within protected memory (either kept encrypted, in memory local to the trusted controller, or protected via through a memory controller). This model context may contain the model and pre-processing instructions but translated in a way that makes it easy or appropriate for the computing device 102 platform to use (e.g., to be loaded onto the ML module 120).

If the ML model 114 comes into use, the control module 804 may copy the ML model 114 into protected areas within a control, data plane architecture such as an ML hardware accelerator and/or protected CPU processor. In some examples, after the ML model 114 has completed its task, the ML model 114 may be explicitly deleted.

Thus, in some examples, the control module 804 within a control/data plane architecture may manage the confidentiality of the model. In some examples, the control module 804 enforces a data flow pipeline such that arbitrary data queries cannot be fed into the model, which may prevent the use of the ML-based model stealing techniques.

In another example, implicit attestation may be used to generate the encryption identity keys, which help ensure that models can be decrypted and available to the control module 804 when the system 100 has booted with the appropriate protection mechanisms.

The apparatus 800 (as well as any other apparatus, machine readable media and/or method described herein) may provide a trustable way of managing models at the edge (or any computing device that is not trusted by a third party entity) such that the IP in the ML model 114 does not leak to the service user or the owner of the system 100.

Figure 9:
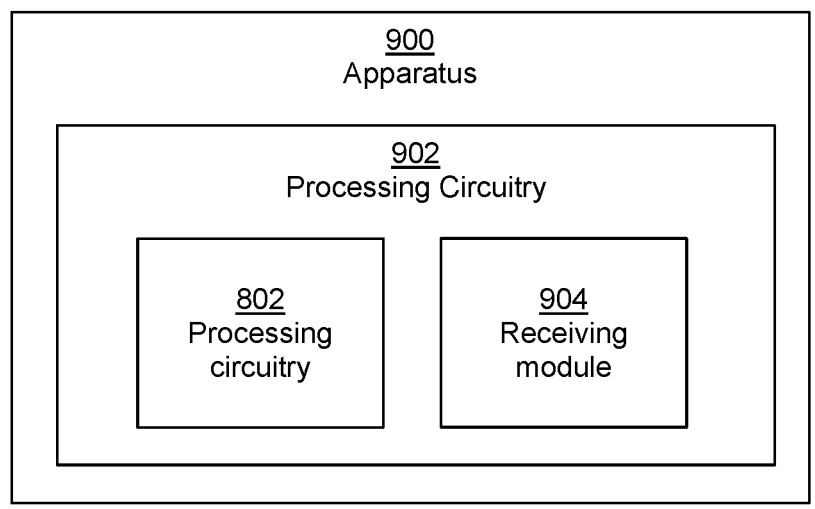
FIG. 9 is a simplified schematic illustration of an example apparatus for implementing part of the example system of FIG. 1.

FIG. 9 shows a schematic illustration of an example apparatus 900 for implementing at least part of the system 100. In this example, the apparatus 900 implements certain functionality of the control module 122, for example, to secure an ML model owned or controlled by a third party entity such as a service provider. The apparatus 900 comprises processing circuitry 902 (e.g., which may implement other functionality such as implemented by other methods or machine readable media described herein). In this example, the processing circuitry 902 comprises the processing circuitry 802 of FIG. 8 and a receiving module 904.

In use of the apparatus 900, the receiving module 904 is to receive the information regarding the machine learning model and/or the third party policy (e.g., within the 'additional information'), for example, from the OS 116 and/or the cloud 104. Where, in response to receiving the information, the control module 802 is to create a model context within the memory. The memory may be a local memory of the control module 802 and/or a cryptographically protected part of the memory 112 that is accessible to the control module 804.

In some examples, the control module 804 is to encrypt the received information under a public key of the control module 804, where the control module 804 is to cause the encrypted information to be stored in the memory.

In some examples, the memory comprises a protected memory isolated from the computing device 102 by the control module 804.

In some examples, the control module 804 is to convert the information regarding the machine learning model and/or the third party policy into a format recognized by the computing device 102 (e.g., a component thereof) for setting up a data processing pipeline in the computing device 102 that complies with the third party policy. For example, the instruction language used to control the set-up of the computing device 102 may be different to the language used to define the ML model 114 and/or the third party policy. Thus, by converting into the recognizable format, the information regarding the ML model 114 and/or third party policy may be understood by the computing device 102.

In some examples, in response to receiving the indication, the control module 804 is to cause the computing device 102 to load (at least part of) the ML model 114 to execute a specified task, and, in response to receiving an additional indication that the specified task is complete, the control module 804 is to cause the computing device 102 to delete loaded information (e.g., from the memory) regarding the machine learning model to prevent further execution of the machine learning model.

In some examples, the control module 804 is to enforce a data processing pipeline by ensuring that a data handling module of the computing device 102 under control of the control module 122 operates in accordance with the third party policy. In some examples, the data handling module comprises a data input module (e.g., data source 108); a data transformation module 118; and/or a machine learning module 120.

In some examples, any of the modules described above (e.g., the control module 804 and/or receiving module 904) may comprise at least one dedicated processor (e.g., an application specific integrated circuit (ASIC) and/or field programmable gate array (FPGA), etc) for implementing the functionality of the module. In some examples, the functionality of any of the modules described above may be supported by a TPM.

In some examples, the module (e.g., the control module 804 and/or receiving module 904) may comprise at least one processor for implementing instructions which cause the at least one processor to implement the functionality of the module described above. In such examples, the instructions may be stored in a machine-readable medium (not shown) accessible to the at least one processor. In some examples, the module itself comprises the machine-readable medium. In some examples, the machine-readable medium may be separate to the module itself (e.g., the at least one processor of the module may be provided in communication with the machine readable medium to access the instructions stored therein).

Figure 10:
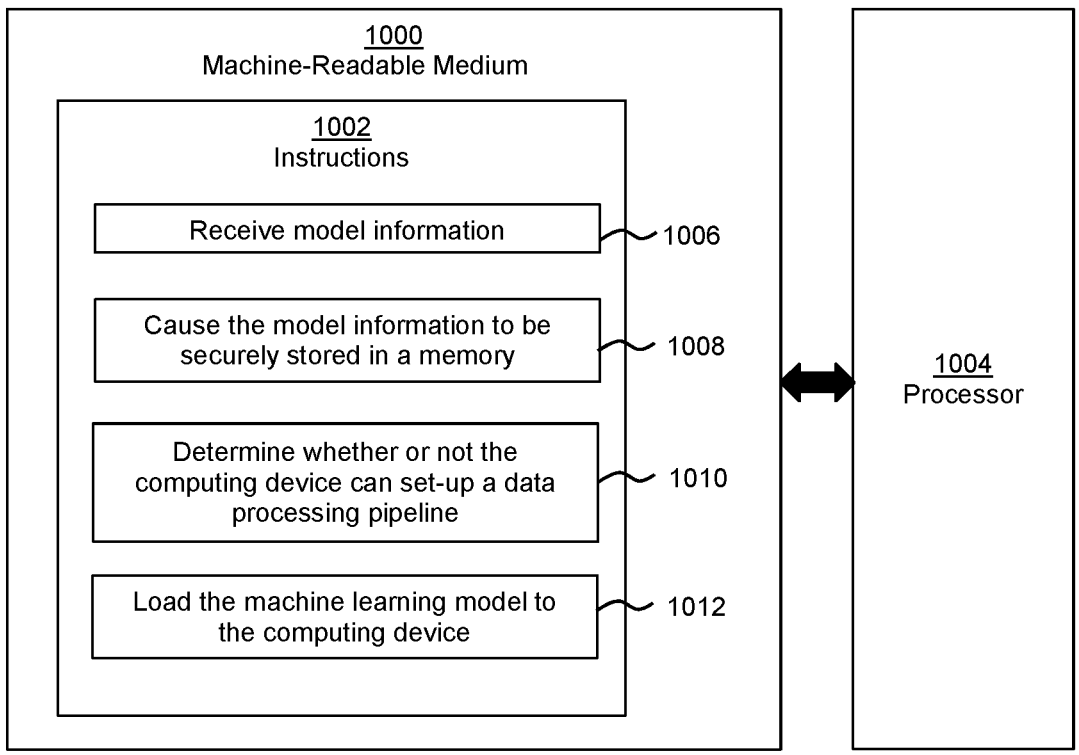
FIG. 10 is a simplified schematic illustration of an example machine-readable medium associated with a processor.

FIG. 10 schematically illustrates a machine-readable medium 1000 (e.g., a tangible machine-readable medium) which stores instructions 1002, which when executed by at least one processor 1004 (e.g., processing circuitry of the control module 122), cause the at least one processor 1004 to implement the functionality of certain parts of the system 100 (e.g., the control module 122). The instructions stored on machine readable medium 1000 may, when executed on the at least one processor 1004, implement the same or similar functionality as the apparatus 800, 900 (e.g., where the instructions are to implement the modules described in relation to these apparatus 800, 900).

The instructions 1002 comprise instructions 1006 to receive model information owned by a service provider.

The instructions 1002 comprise instructions 1008 to cause the model information to be securely stored in a memory accessible to a computing device 102 for executing a machine learning model 114 obtained from the model information.

The instructions 1002 further comprise instructions 1010 to determine whether or not the computing device 102 can set-up a data processing pipeline to execute the machine learning model in accordance with a model execution condition specified by the service provider.

The instructions 1002 further comprise instructions 1012 that, in response to determining that the machine learning model can be executed in accordance with the model execution condition, load the machine learning model to the computing device 102 in a format to enable the computing device 102 to execute the machine learning model 114.

In some examples, the instructions 1010 to determine whether or not the computing device 102 can set-up the data processing pipeline comprise instructions to: receive a measurement pertaining to the computing device 102; generate a key pair that is sealed to the measurement; and cause a public portion of the key pair to be sent to the service provider.

In some examples, determining that the machine learning model can be executed by the computing device 102 and in response to the machine learning model being loaded to the computing device 102, the instructions 1012 may cause execution of the machine learning model.

In some examples, the received model information comprises an encrypted version of the machine learning model that is encrypted by the service provider under the public portion of the key pair.

In some examples, the instructions 1012 to load the machine learning model to the computing device 102 comprise instructions to release a private portion of the key pair to enable the computing device 102 to decrypt the encrypted version of the machine learning model and load the machine learning model to the computing device 102.

In some examples, the received model information further comprises a nonce that is encrypted by the service provider under the public portion of the key pair.

In some examples, the received model information further comprise instructions to decrypt the nonce using a private portion of the key pair and cause the decrypted nonce to be sent to the service provider.

In some examples, the received model information further comprises a nonce for use as a message authentication code (MAC) function key (e.g., a hash-based MAC (HMAC) function key) to certify a result obtained by execution of the machine learning model.

Figure 11:
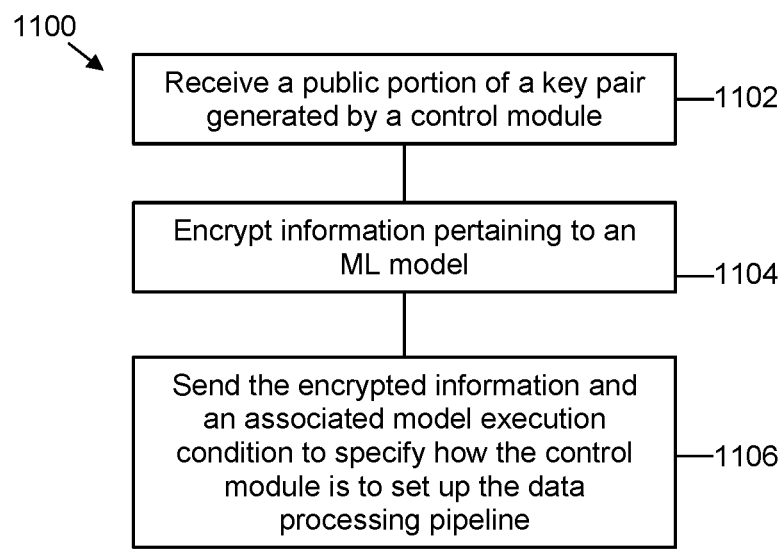
FIG. 11 is a flowchart of an example method for implementing part of the example system of FIG. 1.

FIG. 11 shows a flowchart of an example method 1100 for implementing certain functionality of the third party entity such as a service provider. Thus, the method 1100 may be implemented at a third party device such as a server controlled by the third party entity (e.g., at or accessible via the cloud 104). Reference is made to certain components of the system 100 depicted by FIG. 1. In some examples, the method 1100 describes the interaction between the third party entity and the control module described above and actions taken by the third party entity to protect its IP in the ML model 114.

The method 1100 comprises, at block 1102, receiving a public portion of a key pair generated by a control module for setting up a data processing pipeline of a computing device. The key pair is sealed to a measurement obtained by a trusted component (e.g., a TPM) of the computing device 102. In this block 1102, in some examples, the TPM may be trusted to obtain measurements, which may be trusted for the purpose of key generation linked to those measurements.

The method 1100 comprises, at block 1104, encrypting information pertaining to a machine learning model under the public portion of the key pair.

The method 1100 comprises, at block 1106, sending the encrypted information and an associated model execution condition to specify how the control module 122 is to set up the data processing pipeline.

In some examples, a nonce with the encrypted information and the associated model execution condition may also be sent such that, if the correct nonce is returned, it can be determined that the nonce was safely received by the computing device 102.

The description of the control module 122 and other components given above refers to ensuring that the ML model 114 and other IP may not be lost or attacked on the computing device 102. Certain examples given below refer to the functionality of the attestation module 124 as depicted by system 100 of FIG. 1 and described in relation to the functionality of the control module 122.

Attestation

A third party entity may wish to determine whether the results of an ML model 114 run on a computing device 102 that is under the control of a different authority can be trusted. The system 100 architecture described in FIG. 1 is based on having separate control and data planes with a trusted control module 122 and attestation module 124 that can attest to how the results of running the model were obtained and hence give information as to whether they are trustable.

In some examples, data may be collected at edge devices and as such they may be regarded as an appropriate place to run machine learning models to interpret/use the data. However, the edge devices may be out of the control of the service provider and run by a different authority as well as being potentially subject to attack. Apparatus, machine readable media and methods described herein may enable a service provider to trust the results that come from an ML model 114 running at the edge (or indeed any other computing device in a network not under the control of the service provider).

The service provider may have certain concerns regarding the outcome of executing the ML model 114. Whether or not the service provider can establish certain information about the execution of the ML model 114, may affect whether the results can be trusted. In some examples, the concern may be whether the correct (or an acceptable) ML model 114 has been used by the computing device 102. In some examples, the concern may be whether the ML model 114 that has been customized using incremental learning is still within the bounds of acceptability. In some examples, the concern may be whether the input into the model was protected and whether the data came from the correct sensors (via the data sources 108), and go through an appropriate transformation path (via the transformation module 118).

In an example scenario of reviewing an image classification system, it may be useful to establish: whether the data has come from a real camera, was the path to a pre-processing module secure and free from influence of other components, was the correct image processing applied (e.g. downscaling and normalization e.g., at the transformation module 118)), if feature extraction was implemented then was the correct code used, were any checks specified to validate the quality of the data correctly applied, whether all relevant output of the model has been reported and/or are their missing results.

Accordingly, any results reported by a computing device 102 to a third party entity (e.g., via the cloud 104) may need be verified in order to establish trust in the system 100. In order to provide this verification, in some examples, an end-point architecture comprising the control module 122 and the attestation module 124 is implemented. As described previously, the control module 122 may set up and/or monitor the data capture, data paths, transformations and/or model being used and send an indication to the attestation module 124 containing information to use to generate a statement. The attestation module 124 may then convert this into a signed statement that certain parties may rely on to establish that the attestation came from a trusted component of the computing device 102 (i.e., the attestation module 124).

Figure 12:
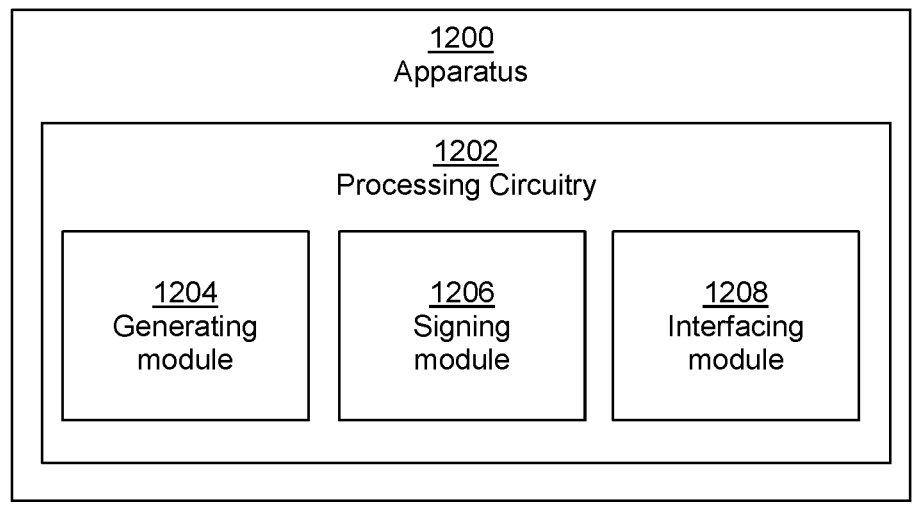
FIG. 12 is a simplified schematic illustration of an example apparatus for implementing part of the example system of FIG. 1.

FIG. 12 shows a schematic illustration of an example apparatus 1200 for implementing at least part of the system 100. In this example, the apparatus 1200 implements certain functionality of the attestation module 124, for example, to provide information for the third party entity regarding the implementation and/or result of executing the ML model 114. The apparatus 1200 comprises processing circuitry 1202 (e.g., which may implement other functionality such as implemented by other methods or machine readable media described herein).

The processing circuitry 1202 comprises a generating module 1204 to generate a statement comprising: a control plane indicator to indicate a control plane state of a computing device 102 used to execute a machine learning model; and information regarding the machine learning model 114. The control module 122 may send an indication to the apparatus 1200 (e.g., the attestation module 124) corresponding to the control plane indicator, which is described in more detail below. In some examples, the statement is generated based on the information accessible to the attestation module (e.g., due to the attestation module receiving this information from the control module itself or due to having access to the information that is made available to the control module).

In some examples, the statement may include the output from the ML model 114 (e.g., over a time window) and may, in some examples, include sequence information of previous time windows, which may allow missing data to be detected and flagged. In some examples, the statement may therefore bind the result of executing the ML model 114 with information about the setup of the computing device 102, the ML model 114 and data provenance/lineage.

In some examples, the service provider may need to determine certain information in order to trust the execution and results of the ML model 114. Such information may include, for example, the output of the ML model 114, where the output sits within a sequence of inferences, the ML model 114 used and/or the state of the data pipeline. The statement provided by the attestation module 124 may ensure that the service provider can determine such information from the statement.

The processing circuitry 1202 further comprises a signing module 1206 to generate a signature for the statement using an attestation key associated with the apparatus 1200. In some examples, a root of trust such as a TPM may support the signing functionality of the signing module 1206 through a key management function.

The processing circuitry 1202 further comprises an interfacing module 1208 to send the statement and the signature to a requesting entity (e.g., such as to a service provider via the network 106).

In some examples, if the output of a model (e.g., an inferencing decision) is being communicated remotely, securely to another process or added to a secure log then the third party entity may need to record how the decision was made and trust the received data. The attestation module 124 described above (and implemented as the apparatus 1200 in this example) may be used to provide trust in the results output by the computing device 102. In some examples, the apparatus 1200 may be a separate component to the apparatus 100, 200, 800 or 900 (i.e., the control module 122). In some examples, the apparatus 1200 may be a sub-component of the apparatus 100, 200, 800 or 900 (i.e., the control module 122).

In some examples, the control plane indicator may refer to the control plane set-up of the computing device 102. As referred to previously, the control plane indicator may be derived from control module 122 and used to demonstrate the lineage and/or provenance of the data that comes into the ML model 114. For example, the control plane indicator may include where secure links are set up between components along with the configuration (and thus expected function) of any pre-processing and transformation functions implemented by the computing device 102 and its components.

In some examples, the attestation module 124 may report the control plane set-up explicitly via an attestation (e.g., an 'attestation statement'), or in some examples, the control module 122 may specify that the control plane set-up is in line with the model contract and provide a hash of that contract.

In some examples, the information about the model may comprise the signer of the ML model 114 (and/or model contract) and the hash of the ML model 114 (and/or model contract).

In some examples, the information regarding the machine learning model 114 comprises an identity indicator of a signer (e.g., the third party entity) controlling a first version of the machine learning model 114. For example, the identity indicator comprises a signed statement to confirm the identity of the signer.

In some examples, the information further comprises a hash of the first version of the machine learning model 114.

In some examples, the information further comprises a hash of a second version of the machine learning model 114, where the second version is modified through incremental learning performed on the first version of the machine learning model 114 by the computing device 102.

In some examples, the information further comprises a hash of a model execution specification associated with the first version and/or second version of the machine learning model 114.

In some examples, an 'execution indicator' may indicate if the ML model 114 has been executed at some point. In other similar words, any data input or output from the computing device 102 may be collected since it may be indicative of execution of the ML model 114 by the computing device 102. If the ML model 114 has been customized through incremental learning then the original signer of the ML model 114, the original hash of the model and the latest hash of the ML model 114 (or of a model update attestation) may be sent with the attestation. In some examples, a hash of the update policies that are to be enforced by the control module 122 may be sent with the attestation. Where there is a test policy in place then the output or success of this test policy may be reported via the attestation.

In some examples, the statement further comprises an execution indicator associated with using the computing device 102 to execute the machine learning model 114.

In some examples, the execution indicator comprises an outcome due to a machine learning module 120 of the computing device 102 executing the machine learning model 114.

In some examples, the outcome comprises a result of executing the machine learning model 114 on input data received by the computing device 102.

In some examples the outcome comprises a decision indicator to indicate a decision made by the computing device 102 when executing the machine learning model 114.

In some examples, the decision indicator comprises a hash of the decision.

In some examples, the decision indicator comprises a chain of hashed decisions made by the computing device 102 when executing the machine learning model 114.

In some examples, the execution indicator comprises an input (e.g., data in the data processing pipeline leading) to the machine learning module 120.

Some examples described herein refer to an explicit attestation where explicit data to confirm that the computing device 102 is set up to execute an ML model 114 is sent by the attestation module 124. In some examples described herein, an implicit attestation mechanism may be used to indicate that the computing device 102 is set up to execute the ML model 114.

In some examples, an ML model 114 may be sent to an endpoint device (e.g., the computing device 102 which decrypts the ML model 114 and then certifies the results as having come from a suitable set up based on trust in the ML sub-system. In some examples, implicit attestation and trusted computing may be used. A workflow may be defined where the model provider can validate the trustworthiness of the remote ML sub-system. An example trusted computing approach may involve requesting an attestation of the sub-system to show it has started with the correct firmware/hardware based on a TPM root of trust. An alternative example may be to use implicit attestation so that keys are encrypted for a TPM key that is sealed and only accessible with a given set of measurements (and hence firmware/ software). Another example may be to use a trusted computing approach where there is a key hierarchy and a (hash-based) measurement system under which keys can be sealed and only accessible given a record of certain system measurements (such as with a TPM). Thus, for a given set of system measurements, a key pair $k_{bind}$ in the key hierarchy may be sealed to a given set of measurements that are to be taken at boot time or when the ML module 120 is started. The public portion $pk_{bind}$ can be shared along with a proof of creation from the TPM to show that access to the associated secret key $sk_{bind}$ can be accessed.

In some examples, the model provider can then send an encrypted model to the computing device 102 where the encryption key $K_{enc}$ and a nonce, nonce, is encrypted with the $pk_{bind}$. The ML model 114 can then be decrypted by the ML module 120 if the software is in an appropriate state (i.e. it has the appropriate measurements enabling the $sk_{bind}$ key to be accessed which in turn means the process started with the appropriate firmware/software set-up).

In some examples, the model provider may be securely supplied with the nonce, in order to demonstrate that the ML model 114 has been decrypted and based on the trust in the software/firmware being measured, the ML model 114 may provide trust that the ML model 114 is being correctly used. The information inferred due to receipt of the correct nonce may be enough for the model provider to trust the results.

Further, in some examples, instead of returning the nonce, the nonce could be used as a key for a message authentication code (MAC) such as a hash-based message authentication code (HMAC) function to certify the results coming from the use of the ML model 114. This MAC/HMAC function may allow the ML subsystem to certify results using an MAC/HMAC rather than signing the outputs, which may reduce the computational overhead. Another example system could involve transferring a secret for a key derivation function (KDF) such as a hash-based key derivation function (HKDF) that could be used to generate the encryption key and various nonces, certification keys and keys used to encrypt the results back for the model provider. Such an approach may enable a secure channel to be set up back to the model provider based on the implicit attestation.

Thus, implicit attestation may provide a trusted path for a model provider to send a model to a trusted subsystem and securely get the results back.

In some examples, the generating module is to generate the execution indicator in response to a determination being made as to whether the input complies with a model execution specification associated with the machine learning model 114.

In some examples, the execution indicator comprises information regarding a second version of the machine learning model 114 developed in response to the computing device 102 training a first version of the machine learning model 114.

In some examples, the execution indicator comprises a result of testing input data monitored by a testing module of the computing device 102 (e.g., implemented by the ML module 120). The testing module may test whether or not the input data is anomalous as specified by a model execution specification associated with the machine learning model 114.

In some examples, the execution indicator comprises an execution instance indicator to provide a trusted indication of an instance when the computing device 102 executes the machine learning model 114.

In some examples, the execution instance indicator comprises a nonce associated with executing the machine learning model 114 at a specified instance.

In some examples, the execution instance indicator further comprises a count indicator associated with each of a series of outputs from the machine learning model 114.

In some examples, the execution instance indicator comprises a counter output of a monotonic counting module (e.g., implemented by the control module 122) of the computing device 102.

In some examples, in response to receiving an execution instance verification request from the requesting entity, the generating module 1204 is to generate the execution instance indicator.

In some examples, the interfacing module 1208 is to send the statement and the signature to the requesting entity in accordance with an instruction specified by a model execution specification associated with the machine learning model 114.

In some examples, the instruction comprises a request received from the requesting entity for the interfacing module 1208 to send the statement and the signature to the requesting entity.

In some examples, the instruction comprises a predetermined pattern (e.g., in time) for the interfacing module to send the statement and the signature to the requesting entity. For example, the predetermined pattern may indicate whether any change has occurred when executing the machine learning model 114.

In some examples, the execution indicator is encrypted (e.g., by the attestation module 124) under a public key of a requesting entity such as a service provider. In some examples, any other part of the statement (e.g., the information regarding the ML model 114, the control plane indicator, etc.) may be encrypted under the public key.

In some examples, the execution indicator may comprise a reference (and/or hash) to any boot time attestation of the control module 122, attestation module 124 and the overall computing device 102. For example, the statement may comprise a boot time attestation indicator associated with the computing device 102. For example, the boot time attestation indicator may refer to measurements obtained during boot time, for example by a TPM.

In some examples, the execution of the model may yield the execution indicator in the form of data input or output from the computing device 102.

For example, the execution indicator may comprise the output of a model (e.g., when used in an inferencing mode) or a series of decisions from the model as used in an inferencing mode. In the case of the series of decisions this could take the form of the end of a hash chain (i.e., a Decision_chain) over a set of decisions. Also, attestations for a given model could be chained so that the previous hash chain value and/or attestation for that model may be included in the attestation. Where results are chained the relying party may ensure they are not missing results.

For example, for a given set of outputs from an ML model 114 for times (i to n) a hash chain may represent the execution indicator, as follows: Decision_chain=hash(hash (hash(hash(prev_Decision_chain∥decision$_i$)∥decision$_{i+1}$)∥ . . . )∥ decision$_n$), where in this example, 'hash' is a cryptographic hash function such as Sha256.

In some examples, the execution indicator may comprise additional test results that accompany the main results from running the ML model 114. For example, the results of additional classification modules to detect adversarial or abnormal input data or sensor stats may be included with the execution indicator. In some examples, such results may be chained in the same way as the main attestation result.

In some examples, the execution indicator may comprise a nonce, attestation counter and/or an internal monotonic counter as requested by a service provider relying on the results. In some cases, the service provider may ask for a series of outputs from the ML model 114 so that each attestation may have the initial nonce along with a counter for the number in the chain. If no nonce is requested, the attestation module may have a monotonic counter so that ordering can be observed.

In some examples, the execution indicator comprises a signature from an attestation key belonging to the attestation module 124.

In some examples, in addition to attestations on model outputs, the attestation module 124 may produce two other forms of attestation as follows.

In an example form of attestation, the attestation may comprise attestation of data and pre-processing undertaken. Thus, instead of attesting to the results of an inferencing model the attestation may be of what would be the input(s) (and possible training data). This attestation may be generated in response to a data collection contract (e.g., within the 'additional information') defining the data flows and may be used to validate the provenance and lineage of the data.

In another example form of attestation, the attestation may comprise an ML model 114 developed by using incremental or edge-based training. This attestation may certify the original model (if any), the data paths, test results and/or the latest version of the model 114 and/or a series of versions of the model 114.

To perform attestation, the attestation module 124 may comprise or be able to access/generate an attestation key to sign the attestation/statement. This key may be certified by the module manufacturer and/or it could be certified by a local TPM on the computing device 102 platform. In this latter case the TPM may measure a secure boot process of the control module 122 and/or attestation module 124. Where, in some examples, the key is built-in and certified by the manufacturer, the attestation may include references to platform attestations from the TPM to show a secure boot process was followed.

As highlighted previously, the system 100 architecture facilitates the handling of separate control and data planes using the trusted control module 122 and attestation module 124. The control module 122 may set up and monitor the data processing pipeline and then provide an indication regarding the set-up of the computing device 102 (e.g., see FIGS. 1 and 2) to allow the attestation module 124, which may have a certified identity, to sign the attestation statement. This system 100 architecture may ensure that the data is trustable and provide evidence for the third party entity that it was the stated attestation module 124 that provided the signed statement to verify the origin of the data providing a public key for the attestation module 124 is available.

In some examples, the indication of the set-up may be provided using a 'control plane indicator'. For example, the control plane indicator may comprise information about at least part of a data pipeline set-up of the computing device 102 for executing the machine learning model 114.

In some examples, the control plane indicator is to indicate that a control plane set-up of the computing device 102 for executing the machine learning model 114 complies with a model execution specification associated with the machine learning model 114. For example, in response to determining the set-up of the computing device 102, the control plane indicator may indicate a detail of this set-up to the attestation module 114 so that the third party can determine whether or not the computing device complies with the model execution specification.

In some examples, any of the modules described above (e.g., the generating module 1204, signing module 1206, interfacing module 1208) may comprise at least one dedicated processor (e.g., an application specific integrated circuit (ASIC) and/or field programmable gate array (FPGA), etc) for implementing the functionality of the module. In some examples, the functionality of any of the modules described above may be supported by a TPM.

In some examples, the module (e.g., the generating module 1204, signing module 1206, interfacing module 1208) may comprise at least one processor for implementing instructions which cause the at least one processor to implement the functionality of the module described above. In such examples, the instructions may be stored in a machine-readable medium (not shown) accessible to the at least one processor. In some examples, the module itself comprises the machine-readable medium. In some examples, the machine-readable medium may be separate to the module itself (e.g., the at least one processor of the module may be provided in communication with the machine readable medium to access the instructions stored therein).

Figure 13:
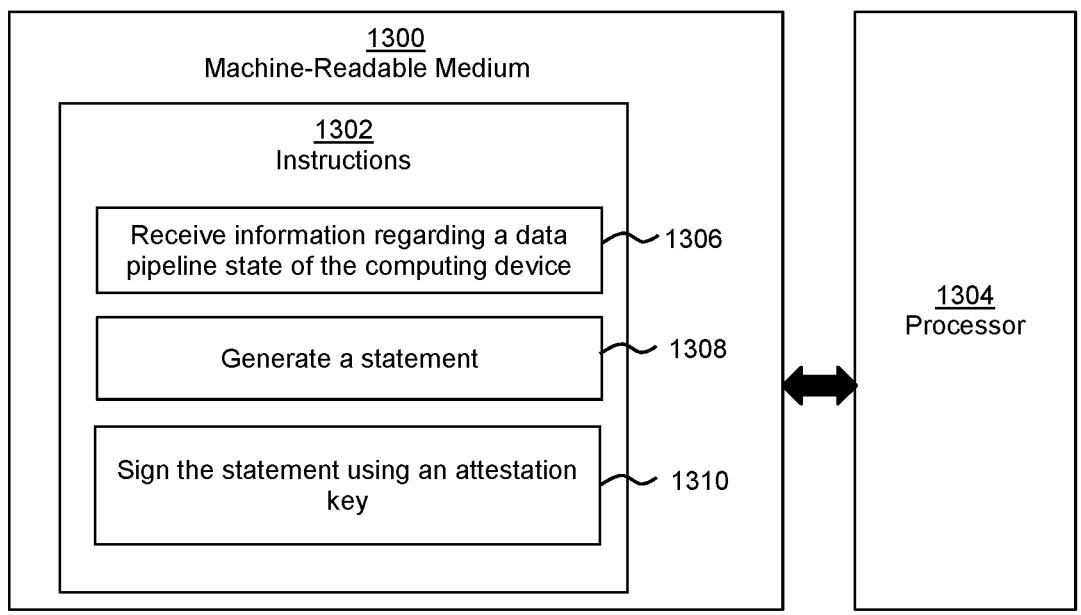
FIG. 13 is a simplified schematic illustration of an example machine-readable medium associated with a processor.

FIG. 13 schematically illustrates a machine-readable medium 1300 (e.g., a tangible machine-readable medium) which stores instructions 1302, which when executed by at least one processor 1304 (e.g., processing circuitry of the attestation module 124), cause the at least one processor 404 to implement the functionality of certain parts of the system 100 (e.g., the attestation module 124). The instructions stored on machine readable medium 1300 may, when executed on the at least one processor 1304, implement the same or similar functionality as the apparatus 1200 (e.g., where the instructions are to implement the modules described in relation to the apparatus 1200).

The instructions 1302 comprises instructions 1306 to receive, from a control module (e.g., the control module 122) communicatively coupled to a machine learning module (e.g., ML module 120) of a computing device 102, information regarding a data pipeline state of the computing device 102.

The instructions 1302 further comprises instructions 1308 to generate a statement comprising: an indication of the data pipeline state (e.g., using information supplied by the control module 122); and information regarding a model (e.g., an ML model 114) executed by the machine learning module 120.

The instructions 1302 further comprises instructions 1310 to sign the statement using an attestation key associated with the at least one processor 1304 to prove the at least one processor 1304 generated the statement.

In some examples, the statement further comprises data from a data pipeline of the computing device 102 obtained when the computing device 102 executes the model.

In use of the machine readable medium 1300 and in response to receiving an attestation request from a requesting entity, the at least one processor 1304 is to send an attestation comprising the statement to the requesting entity (e.g., a third party entity such as a service provider).

Figure 14:
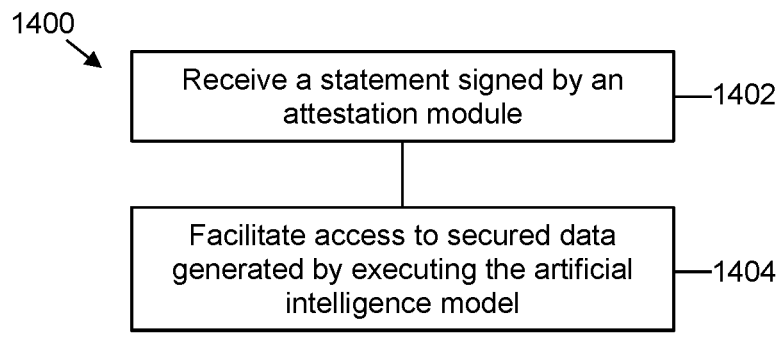
FIG. 14 is a flowchart of an example method for implementing part of the example system of FIG. 1.

FIG. 14 shows a flowchart of an example method 1400 for implementing certain functionality of the third party entity/requesting entity such as a service provider. Thus, the method 1400 may be implemented at a third party device such as a server controlled by the third party entity (e.g., at or accessible via the cloud 104). Reference is made to certain components of the system 100 depicted by FIG. 1. In some examples, the method 1400 describes the interaction between the third party entity and the attestation module described above.

The method 1400 comprises, at block 1402, receiving (e.g., from an attestation module 124 forming part of a data pipeline of a computing device 102 for executing an artificial intelligence model (e.g., an 'ML model 114')) a statement signed by the attestation module 124. The statement comprises a set-up indicator (e.g., a 'control plane indicator') indicating a control plane set-up of the computing device 102; and information regarding the artificial intelligence model.

The method 1400 further comprises, at block 1404 in response to determining that the statement is indicative of the computing device 102 being compliant with a model execution specification associated with the artificial intelligence model (e.g., as defined by the third party entity), facilitating access to secured data generated by executing the artificial intelligence model. For example, the third party entity may send an indication to the control module 122 that causes the control module 122 to load and run the artificial intelligence model on the computing device 102.

Figure 15:
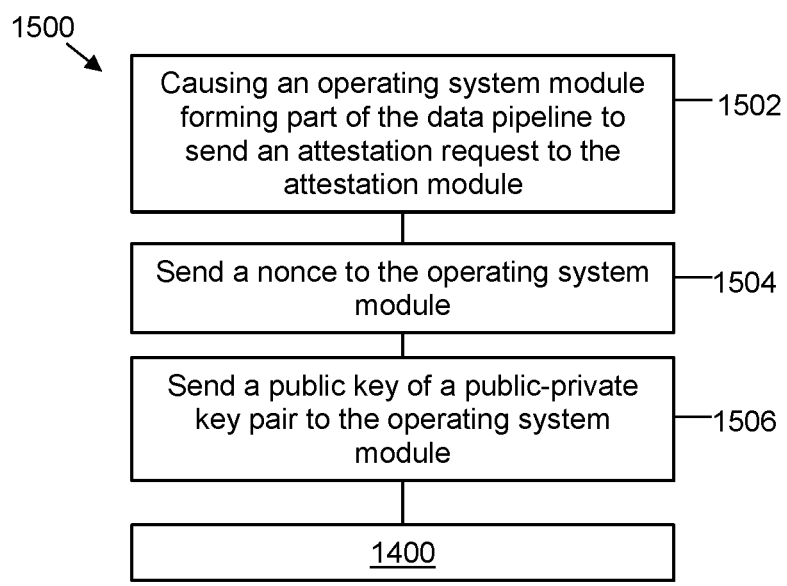
FIG. 15 is a flowchart of an example method for implementing part of the example system of FIG. 1.

FIG. 15 shows a flowchart of an example method 1500 for implementing certain functionality of the third party entity/requesting entity such as a service provider. Thus, the method 1500 may be implemented at a third party device such as a server controlled by the third party entity (e.g., at or accessible via the cloud 104). Reference is made to certain components of the system 100 depicted by FIG. 1. The method 1500 comprises the method 1400 and comprises further blocks as described below. Any combination of these blocks may be implemented in any appropriate order and, where appropriate, certain blocks may be omitted altogether.

In some examples, the method 1500 comprises, at block 1502, causing an operating system module (e.g., OS 116) forming part of the data pipeline to send an attestation request to the attestation module 124 to cause the attestation module 124 to generate and sign the statement.

In some examples, the method 1500 comprises, at block 1504 and prior to causing the operating system module to send the attestation request to the attestation module, sending a nonce to the operating system module such that the nonce is sent with the attestation request to the attestation module. Block 1504 further comprises, in response to receiving the nonce with the statement from the attestation module via the operating system module, determining that the statement is trusted.

In some examples, the statement further comprises a data indicator (e.g., data from the data processing pipeline) obtained from the data pipeline.

In some examples, the method 1500 comprises, at block 1506 and prior to causing the operating system module to send the attestation request to the attestation module, sending a public key of a public-private key pair to the operating system module such that the public key is sent with the attestation request to the attestation module. Block 1504 further comprises using a private key of the public-private key pair to decrypt the data indicator encrypted under the public key (e.g., by the attestation module 124).

Examples described herein refer to various apparatus, machine-readable media and methods. Where a method is described, a corresponding apparatus or machine-readable medium may implement or be used to implement the functionality of the method. Where an apparatus is described, a corresponding method or machine-readable medium may implement or be used to implement the functionality of the apparatus. Where a machine-readable medium is described, a corresponding apparatus or method may implement or be used to implement the functionality of the machine-readable medium. Where a component or entity described herein refers to sending or receiving certain information, a corresponding entity that respectively receives or sends that certain information is hereby disclosed.

Examples in the present disclosure can be provided as methods, systems or as a combination of machine readable instructions and processing circuitry. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules of the system 100 or apparatus 200, 300, 800, 900, 1200 (for example, the control module 122, 204, 804, attestation module 124, 304, transformation module 118 and/or the ML module 120, receiving module 904, generating module 1204, signing module 1206 and/or interfacing module 1208) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An apparatus comprising processing circuitry, the processing circuitry comprising:
    an attestation module to:
        operate in a control plane of a data processing pipeline, and
        generate a cryptographically signed attestation based on a model execution specification that defines a specified state for executing a machine learning model controlled by a third party entity; and
    a control module to:
        operate in the control plane of the data processing pipeline,
        determine whether a computing device communicatively coupled to the control module is in the specified state, and
        send, to the attestation module in response to determining that the computing device is in the specified state, an indication that the computing device is in the specified state.

2. The apparatus of claim 1, wherein, in response to determining that the computing device is not in the specified state, the control module is to send an instruction to the computing device to set-up the computing device in accordance with the specified state.

3. The apparatus of claim 1, wherein the attestation module is to attest to the computing device being in the specified state by sending a signed statement comprising the indication to the third party entity.

4. The apparatus of claim 1, wherein the control module is to verify a signature applied to the machine learning model and/or an associated model specification by the third party entity against a public key associated with the third party entity, and where the control module is to provide verification that the signature matches the public key via the indication.

5. The apparatus of claim 4, wherein, in response to determining that the computing device is in the specified state and that either the machine learning model or the model execution specification or both is verified against the public key associated with the third party entity, the control module is to indicate, via the indication, that the machine learning model is executable by the computing device.

6. The apparatus of claim 1, wherein the indication sent to the attestation module includes a timestamp corresponding to when the computing device was determined to be in the specified state.

7. The apparatus of claim 1, wherein the indication comprises a hash of the machine learning model or the model execution specification to be executed by the computing device.

8. The apparatus of claim 1, wherein the control module is to determine whether the computing device supports an incremental learning procedure prior to sending the indication to the attestation module.

9. The apparatus of claim 1, wherein the control module is to determine whether the computing device supports a distributed learning procedure prior to sending the indication to the attestation module.

10. The apparatus of claim 1, wherein the control module is to initiate execution of a test policy through the machine learning model to validate setup of the computing device prior to sending the indication to the attestation module.

11. A tangible machine readable medium comprising instructions which, when executed by at least one processor, cause the processor to:
    verify, using a cryptographic key, a digital signature associated with a model execution specification that defines one or more conditions for executing a machine learning model controlled by a third party entity;
    determine whether a computing device under control of the processor is capable of operating in accordance with the model execution specification; and
    in response to determining that the computing device is capable of operating in accordance with the model execution specification, cause the computing device to establish a data processing pipeline for executing the machine learning model in accordance with the model execution specification.

12. The tangible machine readable medium of claim 11, wherein the instructions are to cause the processor to:
    obtain information from a data handling module of the computing device in the data processing pipeline regarding a state of the data handling module; and
    determine whether or not the data handling module is capable of operating in accordance with the model execution specification.

13. The tangible machine readable medium of claim 11, wherein the instructions are to cause the computing device to load the machine learning model by setting up a communication channel between a memory storing information regarding the machine learning model and the computing device, and where the instructions are to cause transfer of the information to the computing device.

14. The tangible machine readable medium of claim 13, wherein the instructions are to cause the computing device to execute a test policy through the machine learning model at load time to determine whether or not the computing device is set up in accordance with the model execution specification.

15. A method, comprising:
    generating, by a third party entity, a model execution specification comprising one or more cryptographically verifiable conditions for executing a machine learning model controlled by a third party entity;
    cryptographically signing, using a private key associated with the third party entity, a package of information comprising the model execution specification and the machine learning model; and
    sending the signed package to a control module in control of a computing device for executing the machine learning model,
    wherein the control module, upon verifying a cryptographic signature associated with the signed package, determines whether the computing device satisfies the one or more cryptographically verifiable conditions.

16. The method of claim 15, comprising encrypting the information regarding the machine learning model under a public key of the control module prior to sending the information to the control module.

17. The method of claim 15, comprising, in response to receiving an attestation that the computing device complies with the one or more cryptographically verifiable conditions, causing the control module to facilitate execution of the machine learning model by the computing device in accordance with the one or more cryptographically verifiable conditions.

18. The method of claim 17, comprising, in response to the attestation comprising an indication that the machine learning model was verified against a public key associated with the private key, verifying whether or not the control module has set up the computing device in accordance with the one or more cryptographically verifiable conditions.

19. The method of claim 15, wherein the model execution specification a condition comprises from the group consisting of:

a description of a specified data processing pipeline for executing the machine learning model;
an associated hash of the machine learning model;
a test procedure indicator; and
an incremental learning procedure indicator and/or a distributed learning procedure indicator.

20. The method of claim 15, wherein the information and/or the one or more cryptographically verifiable conditions comprises a public key of a service provider authorized by the third party entity to receive an encrypted result obtained by executing the machine learning model on the computing device.

21. The method of claim 15, wherein the information comprises a public key of a service provider authorized by the third party entity to receive an encrypted result obtained by executing the machine learning model on the computing device.

* * * * *